United States Patent
Hayashi et al.

(10) Patent No.: US 6,800,684 B2
(45) Date of Patent: *Oct. 5, 2004

(54) COMPOSITE PARTICLES, AND TREAD RUBBER COMPOSITION, PAINT AND RESIN COMPOSITION USING THE SAME

(75) Inventors: Kazuyuki Hayashi, Hiroshima (JP); Hiroko Morii, Hiroshima (JP); Keisuke Iwasaki, Hiroshima (JP); Mineko Ohsugi, Hiroshima (JP); Yusuke Shimohata, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 192 days.

This patent is subject to a terminal disclaimer.

(21) Appl. No.: 10/142,946

(22) Filed: May 13, 2002

(65) Prior Publication Data

US 2003/0105213 A1 Jun. 5, 2003

(30) Foreign Application Priority Data

May 16, 2001 (JP) ........................ 2001-146940
Nov. 14, 2001 (JP) ........................ 2001-348147
Nov. 27, 2001 (JP) ........................ 2001-360293

(51) Int. Cl.$^7$ ............................ C08K 3/34; C08K 9/12
(52) U.S. Cl. ..................... 524/442; 524/430; 524/445; 524/446; 523/214; 523/215; 523/210; 523/216
(58) Field of Search ................................ 524/492, 430, 524/495, 496, 437; 523/214, 215, 210, 216

(56) References Cited

U.S. PATENT DOCUMENTS

| | | | | |
|---|---|---|---|---|
| 3,509,073 A | | 4/1970 | Bowman | |
| 6,666,914 B2 | * | 12/2003 | Hayashi et al. | ............. 106/499 |
| 2003/0138714 A1 | * | 7/2003 | Hayashi et al. | .......... 430/108.3 |
| 2003/0205699 A1 | * | 11/2003 | Morii et al. | ................ 252/500 |

FOREIGN PATENT DOCUMENTS

| EP | 0 913 431 A2 | 5/1999 |
|---|---|---|
| GB | 743630 | 1/1956 |

* cited by examiner

Primary Examiner—Edward J. Cain
Assistant Examiner—Katarzyna Wyrozebski
(74) Attorney, Agent, or Firm—Nixon & Vanderhye P.C.

(57) ABSTRACT

Composite particles capable of an excellent dispersibility and an excellent light resistance of the present invention have an average particle diameter of 0.001 to 12.0 μm, comprise:

white inorganic particles as core particles;
a gluing agent-coating layer formed on at least a parts of the surface of said white inorganic particle; and
a black pigment coat composed of carbon black, aniline black or both carbon black and aniline black, formed onto at least a part of the gluing agent-coating layer in an amount of from 1 to 500 parts by weight based on 100 parts by weight of said white inorganic particles.

22 Claims, No Drawings

COMPOSITE PARTICLES, AND TREAD RUBBER COMPOSITION, PAINT AND RESIN COMPOSITION USING THE SAME

BACKGROUND OF THE INVENTION

The present invention relates to composite particles, and a tread rubber composition, a paint and a resin composition using the composite particles, and more particularly, to composite particles capable of an excellent dispersibility and an excellent light resistance; a tread rubber composition prepared by blending the composite particles in rubber, which can show a less discoloration upon exposure to light, a low electric resistance, an excellent wear resistance and an excellent tensile strength; and a paint containing the composite particles and a resin composition containing the composite particles.

The composite particles of the present invention can be used as pigments, or colorants, fillers or the like for rubbers, paints and resin compositions.

As white inorganic particles having a refractive index of less than 2.0, there are generally known extender pigments. The extender pigments form a transparent or translucent dispersion when dispersed in vehicles such as oils and varnishes. Therefore, the extender pigments have been conventionally used as non-color pigments, i.e., as extenders for paints, printing inks or the like. With the progress of powder science or technology, the extender pigments have been recently used not only as extenders, but also as function-imparting pigments in extensive industrial fields for the purpose of controlling or improving the processability and physical properties of rubbers, plastics, paints, printing inks, adhesives, sealing materials, papers or the like.

However, although the extender pigments show transparency or translucency in vehicle, paints or resin compositions to which the extender pigments are added as fillers, exhibit a more whitish color than those containing no extender pigments, and fail to show a sufficient blackness required in some application fields.

White inorganic particles having a refractive index of not less than 2.0 such as titanium oxide, zinc oxide and zirconium oxide, have been conventionally used as white pigments for rubbers, plastics, paints or printing inks.

In particular, it is known that titanium oxide and zinc oxide exhibit an ultraviolet light-shielding effect because these pigments can absorb light in ultraviolet region. In recent years, the titanium oxide and zinc oxide are also used as an ultraviolet light absorber for cosmetics or the like.

However, it is also known that the titanium oxide and zinc oxide have a high surface activity. Therefore, when paints or resin compositions using these pigments are exposed to outdoor environments, there arise problems such as chalking of a painted surface and deterioration of resins.

In addition, white inorganic particles are generally non-conductive, for example, silica particles and zinc oxide have volume resistivity values of about $10^6$ to $10^8$ $\Omega \cdot cm$ and about $10^7$ $\Omega \cdot cm$, respectively. Therefore, it is known that in the applications requiring a higher or lower volume resistivity value, it is necessary to use an electric resistance-regulating agent such as carbon black or the like in addition to the white inorganic particles.

On the other hand, black pigments such as aniline black, carbon black or the like have been extensively used in various applications such as inks, paints, rubbers and plastics for the purpose of imparting thereto a tinting property, electric properties, a light-absorbing property or the like.

However, it is known that these black pigments, especially carbon black, are fine particles having an average particle diameter as small as about 0.005 to 0.05 $\mu m$ and, therefore, it is difficult to disperse carbon black in vehicles or resin compositions. In addition, it is also known that these black pigments are bulky particles having a bulk density as high as about 0.1 $g/cm^3$ and, therefore, are deteriorated in handling property and workability.

Further, since the paints or resin compositions using such black particles are sometimes used in outdoor applications and exposed to direct sunlight or severe weather conditions such as winds and rains, the black particles are required to maintain a good hue and properties thereof for a long period of time, namely to show excellent light resistance and weather resistance.

Consequently, it has been strongly required to provide black particles capable not only imparting thereto various properties such as electric properties, ultraviolet light-absorbing property or the like according to applications thereof, but also exhibiting excellent light resistance, tinting strength and dispersibility in vehicle.

Hitherto, it is known that silica particles are blended together with carbon black in rubbers for the purposes of reduction in electric resistance of the rubbers as well as reinforcement thereof (Japanese Patent Application Laid-Open (KOKAI) No. 52-93452(1977), and Japanese Patent Nos. 2722077, 2788212 and 3160552).

In addition, it is also known that titanium oxide or zinc oxide is coated with a silica-based substance in order to suppress the surface activity (Japanese Patent Application Laid-Open (KOKAI) Nos. 2000-319128 and 2001-58821).

At present, it has been strongly required to provide composite particles capable of not only imparting thereto various properties such as electric properties, ultraviolet light-shielding property, according to the applications thereof, but also exhibiting excellent light resistance, tinting strength, handling property and dispersibility in vehicle. However, conventional composite particles have failed to satisfy all of these requirements.

Namely, in Japanese Patent Application Laid-Open (KOKAI) No. 52-93452(1977) and Japanese Patent Nos. 2722077 and 3160552, there are described carbon-coated silica particles and a rubber composition containing such coated silica particles which are used for tires. However, in any of these, since a carbon black coat is formed on the surface of the silica particle by thermal decomposition of organic compounds, the adhesion of carbon black onto the surface of the silica particle is very weak. Therefore, when the coated silica particles are kneaded in the rubber composition, the carbon black coated is desorbed or fallen-off from the surface of the silica particle, so that a part of the surface of the silica particles is exposed. This results in non-uniform dispersion of the silica particles in the rubber composition, and failure to exhibit sufficient the above-mentioned effects.

The rubber composition described in Japanese Patent No. 2788212 is a tire tread rubber composition containing carbon black surface-treated with 0.1 to 50% by weight of silica. However, the adhesion of silica onto the surface of carbon black is very weak. Therefore, when the coated carbon black is kneaded in the rubber composition, the silica coated thereon is desorbed or fallen-off from the surface of the carbon black, thereby preventing carbon black from being uniformly dispersed in the composition.

Also, in Japanese Patent Application Laid-Open (KOKAI) Nos. 2000-319128 and 2001-58821, there is described zinc oxide or titanium oxide whose surface is coated with silica, silica-based substances such as alkyl-modified silica, zinc silicate or the like. However, the coating formed on zinc oxide or titanium oxide fails to sufficiently reduce the surface activity thereof.

In Japanese Patent Application Laid-Open (KOKAI) Nos. 11-323174(1999) and 2001-11339, there are described iron-based composite particles comprising black iron oxide particles or black iron oxide hydroxide particles as core particles, a coating layer formed on the surface of the core particle which comprises organosilane compounds obtainable from alkoxysilanes or polysiloxanes, and a carbon black coat coated onto the surface of the coating layer composed of organosilane compounds or polysiloxanes. However, these techniques are related to the method of fixedly coating carbon black onto the black iron compound particles. Since the core particles show a magnetism, the obtained composite particles cannot be used in applications in which such a magnetism is unnecessary and unsuitable, and tend to suffer from magnetic agglomeration, resulting in poor dispersibility.

Separately, automobile tires have been required to exhibit a good road grip property even upon running on a wet road in order to attain a high running safety, as well as high wear resistance and high break strength. In recent years, from the standpoints of saving energy and resources, automobile tires having a low-rolling resistance for reducing fuel consumption, i.e., so-called low-fuel consumption tires have been positively developed.

The automobile tires having a high electric resistance tend to generate noises in radio and electronic devices by undesired static discharge due to dielectric breakdown, or tend to cause fire by spark between tire and automobile body due to static electrification thereof, upon fueling. Therefore, the automobile tires have been strongly required to exhibit a low electric resistance.

Conventionally, carbon black is blended in a rubber composition for tires or the like for the purposes of reinforcement, increase of wear resistance or reduction of electric resistance. However, it is known that such carbon black-containing tires have a large rolling resistance, resulting in large fuel consumption of automobiles.

Consequently, tires in which silica particles capable of reducing a rolling resistance as compared to carbon black are blended as a rubber-reinforcing filler, have been proposed and already put into practice (Japanese Patent Application Laid-Open (KOKAI) No. 3-239737(1991)).

However, since the silica particles have a silanol functional group on the surface thereof and, therefore, tend to be agglomerated together by hydrogen bonds between the silanol groups, it has been difficult to uniformly disperse the silica particles in the rubber composition for tires or the like. In addition, it is known that the silica particles show a low compatibility with rubbers ordinarily used for tires because of a hydrophilic property of the silanol group present on the surface thereof, resulting in poorer reinforcing effect as compared to carbon black.

In order to improve the dispersibility of the silica particles in rubbers, there has been proposed the method of treating the surface of the silica particles with an organosilicon compound (Japanese Patent Application Laid-Open (KOKAI) No. 8-245838(1996)).

Further, when the silica particles are used as a reinforcing filler, an electric resistance of tires increase owing to non-conductivity thereof. Therefore, tires using conductive particles such as carbon black in combination with the silica particles have been proposed and already put into practice (Japanese Patent Application Laid-Open (KOKAI) Nos. 52-93452(1977), 3-239737(1991) and 8-245838(1996), Japanese Patent Nos. 2722077, 2788212 and 3160552, etc.).

Furthermore, ordinary automobile tires are colored black and, therefore, have been strongly required to exhibit a high blackness as well as a less discoloration upon exposure to light from the viewpoint of good appearance.

Also, at present, it has been strongly required to provide a tread rubber composition exhibiting a less discoloration upon exposure to light, a low electric resistance, an excellent wear resistance and an excellent tensile strength. However, conventional tread rubber compositions have failed to satisfy all of these requirements.

Namely, the tire tread composition described in Japanese Patent Application Laid-Open (KOKAI) No. 3-239737 (1991), comprises 100 parts by weight of a rubber blend containing a styrene-butadiene copolymer prepared by copolymerizing styrene and butadiene in the presence of an organolithium compound, in an amount of not less than 30 parts by weight; 10 to 150 parts by weight of silica particles; and 0 to 100 parts by weight of carbon black. However, since the silica particles are non-uniformly dispersed in the rubber composition, it is difficult to attain excellent wear resistance and tensile strength. In addition, since the silica particles prevent carbon black from being uniformly dispersed, it is difficult to reduce an electric resistance of the obtained composition.

In Japanese Patent Application Laid-Open (KOKAI) No. 52-93452(1977) and Japanese Patent Nos. 2722077 and 3160552, as seen from the above, the adhesion of carbon black to the surface of the silica particle is very weak (shown below in Comparative Examples). Therefore, the silica particles are non-uniformly dispersed in the rubber composition, resulting in deterioration in wear resistance and tensile strength.

As a result of the present inventors' earnest studies, it has been found that composite particles having an average particle size of 0.001 to 12.0 $\mu$m, which comprise white inorganic particles; a gluing agent-coating layer formed on at least a part of the surface of the white inorganic particle, comprising at least one gluing agent selected from the group consisting of organosilicon compounds, various coupling agents such as silane-based coupling agents, titanate-based coupling agents, aluminate-based coupling agents and zirconate-based coupling agents, oligomer compounds and polymer compounds; and a black pigment coat composed of carbon black and/or aniline black, formed on at least a part of the surface of the coating layer composed of the gluing agent in an amount of 1 to 500 parts by weight based on 100 parts by weight of the white inorganic particles, can exhibit an excellent light resistance and dispersibility. The present invention has been attained on the basis of the finding.

SUMMARY OF THE INVENTION

An object of the present invention is to provide composite particles exhibiting an excellent light resistance and an excellent dispersibility.

An object of the present invention is to provide black composite particles for a tread rubber composition, which exhibit not only a high blackness and a less discoloration upon exposure to light, but also a low volume resistivity value and an excellent dispersibility An object of the present invention is to provide black composite particles for a paint or a resin composition, which is capable of not only imparting thereto various functions according to applications thereof, but also exhibiting excellent light resistance, tinting strength and dispersibility in vehicle.

An object of the present invention is to provide composite particles for a paint or a resin composition, which is capable of not only imparting thereto various functions according to applications thereof, but also exhibiting especially an excellent ultraviolet light-shielding property as well as excellent light resistance, handling property and dispersibility in vehicle.

An object of the present invention is to provide a tread rubber composition capable of exhibiting a less discoloration upon exposure to light, a low electric resistance, and excellent wear resistance and tensile strength.

An object of the present invention is to provide a paint or a resin composition capable of exhibiting a high blackness, a more excellent light resistance and a more excellent storage stability.

An object of the present invention is to provide a paint or a resin composition capable of exhibiting a more excellent light resistance and a more excellent storage stability.

To accomplish the aims, in a first aspect of the present invention, there are provided composite particles having an average particle diameter of 0.001 to 12.0 $\mu$m, comprising:

white inorganic particles as core particles;

a gluing agent-coating layer formed on at least a parts of the surface of said white inorganic particle; and a black pigment coat composed of carbon black, aniline black or both carbon black and aniline black, formed onto at least a part of the gluing agent-coating layer in an amount of from 1 to 500 parts by weight based on 100 parts by weight of said white inorganic particles.

In a second aspect of the present invention, there are provided composite particles having an average particle diameter of 0.001 to 12.0 $\mu$m, comprising:

white inorganic particles as core particles;

a coating layer formed on at least a parts of the surface of said white inorganic particle, comprising at least one compound selected from the group consisting of hydroxides of aluminum, oxides of aluminum, hydroxides of silicon and oxides of silicon, a gluing agent-coating layer formed on at least a parts of the surface of said coating layer; and a black pigment coat composed of carbon black, aniline black or both carbon black and aniline black, formed onto at least a part of the gluing agent-coating layer in an amount of from 1 to 500 parts by weight based on 100 parts by weight of said white inorganic particles.

In a third aspect of the present invention, there are provided composite particles having an average particle diameter of 0.001 to 0.5 $\mu$m, and comprising:

silica particles (1) as core particles;

a coating layer formed on at least a part of the surface of the silica particles (1), comprising organosilane compounds obtainable from alkoxysilanes, or polysiloxanes; and a carbon black coat formed on at least a part of the surface of the coating layer in an amount of 1 to 500 parts by weight based on 100 parts of the silica particles (1).

In a fourth aspect of the present invention, there are provided composite particles having an average particle diameter of 0.001 to 0.5 $\mu$m, and comprising:

silica particles (1) as core particles;

a coating layer formed on at least a part of the surface of the silica particles (1), comprising organosilane compounds obtainable from alkoxysilanes, or polysiloxanes;

a carbon black coat formed on at least a part of the surface of the coating layer in an amount of 1 to 500 parts by weight based on 100 parts of the silica particles (1); and an outer surface coat formed on at least a part of the surface of the carbon black coat, comprising a fatty acid, a metal salt of fatty acid or a coupling agent.

In a fifth aspect of the present invention, there are provided composite particles having an average particle diameter of 0.001 to 12.0 $\mu$m, and comprising:

white inorganic particles having a refractive index of less than 2.0 as core particles;

a gluing agent-coating layer formed on at least a part of the surface of the white inorganic particle; and a black pigment coat formed onto at least a part of the gluing agent-coating layer in an amount of from 1 to 500 parts by weight based on 100 parts by weight of the white inorganic particles, composed of carbon black, aniline black or both carbon black and aniline black.

In a sixth aspect of the present invention, there are provided composite particles having an average particle diameter of 0.001 to 12.0 $\mu$m, and comprising:

white inorganic particles having a refractive index of not less than 2.0 as core particles;

a gluing agent-coating layer formed on at least a part of the surface of the white inorganic particle; and a black pigment coat formed onto at least a part of the gluing agent-coating layer in an amount of from 1 to 500 parts by weight based on 100 parts by weight of the white inorganic particles, comprising carbon black and/or aniline black.

In a seventh aspect of the present invention, there is provided a pigment comprising composite particles defined in any one of the first to sixth aspects.

In an eighth aspect of the present invention, there is provided a tread rubber composition, comprising:

100 parts by weight of a rubber component; and 10 to 200 parts by weight of the pigment composed of composite particles having an average particle diameter of 0.001 to 0.5 $\mu$m, and comprising:

silica particles (1) as core particles;

a coating layer formed on at least a part of the surface of the silica particles (1), comprising organosilane compounds obtainable from alkoxysilanes, or polysiloxanes; and a carbon black coat formed on at least a part of the surface of the coating layer in an amount of 1 to 500 parts by weight based on 100 parts of the silica particles (1).

In a ninth aspect of the present invention, there is provided a paint comprising:

a paint base material, and a pigment composed of (i) composite particles having an average particle diameter of 0.001 to 12.0 $\mu$m, and comprising:

white inorganic particles having a refractive index of less than 2.0 as core particles;

a gluing agent-coating layer formed on at least a part of the surface of the white inorganic particle; and a black pigment coat formed onto at least a part of the gluing agent-coating layer in an amount of from 1 to 500 parts by weight based on 100 parts by weight of the white inorganic particles, composed of carbon black, aniline black or both carbon black and aniline black, (ii) composite particles having an average particle diameter of 0.001 to 12.0 μm, and comprising:

white inorganic particles having a refractive index of not less than 2.0 as core particles;

a gluing agent-coating layer formed on at least a part of the surface of the white inorganic particle; and a black pigment coat formed onto at least a part of the gluing agent-coating layer in an amount of from 1 to 500 parts by weight based on 100 parts by weight of the white inorganic particles, comprising carbon black and/or aniline black.

In a tenth aspect of the present invention, there is provided a rubber or resin composition comprising:

a base material for rubber or resin composition, and a pigment composed of (i) composite particles having an average particle diameter of 0.001 to 12.0 μm, and comprising:

white inorganic particles having a refractive index of less than 2.0 as core particles;

a gluing agent-coating layer formed on at least a part of the surface of the white inorganic particle; and a black pigment coat formed onto at least a part of the gluing agent-coating layer in an amount of from 1 to 500 parts by weight based on 100 parts by weight of the white inorganic particles, composed of carbon black, aniline black or both carbon black and aniline black, (ii) composite particles having an average particle diameter of 0.001 to 12.0 μm, and comprising:

white inorganic particles having a refractive index of not less than 2.0 as core particles;

a gluing agent-coating layer formed on at least a part of the surface of the white inorganic particle; and a black pigment coat formed onto at least a part of the gluing agent-coating layer in an amount of from 1 to 500 parts by weight based on 100 parts by weight of the white inorganic particles, comprising carbon black and/or aniline black.

DETAILED DESCRIPTION OF THE INVENTION

The present invention is described in detail below.

First, the composite particles according to the present invention are described.

As the white inorganic particles used as core particles in the present invention, there may be exemplified (1) silica particles, (2) white inorganic particles having a refractive index of less than 2.0, and (3) white inorganic particles having a refractive index of not less than 2.0.

As the silica particles (1), there may be exemplified particles of any material containing silica as a main component, e.g., white carbon such as anhydrous silicic acid powder, hydrous silicic acid powder and silicate powder, and silica gel. In the consideration of good dispersibility of the obtained composite particles, among these materials, anhydrous silicic acid powder and hydrous silicic acid powder are preferred.

As the white inorganic particles (2) having a refractive index of less than 2.0, there may be exemplified silica particles such as white carbon (such as anhydrous silicic acid powder, hydrous silicic acid powder and silicate powder), diatomaceous earth powder and silica gel; and extender pigments such as clay, calcium carbonate, barium sulfate, alumina white and talc.

As the white inorganic particles (3) having a refractive index of not less than 2.0, there may be exemplified white pigments such as titanium oxide and zinc oxide.

The white inorganic particles may be particles having any suitable shape, such as spherical particles, granular particles, polyhedral particles, acicular particles, spindle-shaped particles, rice grain-shaped particles, flake-shaped particles, scale-like particles, plate-shaped particles and amorphous particles. The shape of the silica particles (1) for the tread rubber composition is preferably spherical or granular.

The particle size of the white inorganic particles may be appropriately determined according to the applications thereof, and the average particle diameter of the white inorganic particles is usually 0.0009 to 12.0 μm.

More specifically, the silica particles (1) for the tread rubber composition have an average particle diameter of preferably 0.001 to 0.50 μm, more preferably 0.002 to 0.45 μm, still more preferably 0.003 to 0.40 1 μm.

When the average particle diameter of the silica particles (1) for the tread rubber composition is more than 0.50 μm, the obtained composite particles may become coarse particles and, therefore, tend to be deteriorated in dispersibility in the tread rubber composition. When the average particle diameter of the silica particles (1) for the tread rubber composition is less than 0.001 μm, such particles may tend to be agglomerated together by the increase of intermolecular force therebetween due to fine particles, so that it may be difficult to form a uniform coating layer composed of the gluing agent, for example, alkoxysilanes or polysiloxanes on the surface of the silica particles, and uniformly coat carbon black on the coating layer composed of the gluing agent.

The white inorganic particles (2) having a refractive index of less than 2.0 and the white inorganic particles (3) having a refractive index of not less than 2.0 have an average particle diameter of usually 0.0009 to 12.0 μm, preferably 0.0014 to 11.0 μm, more preferably 0.0019 to 10. 0 μm.

When the average particle diameter of the white inorganic particles (2) having a refractive index of less than 2.0 and the white inorganic particles (3) having a refractive index of not less than 2.0 is more than 12.0 μm, the obtained composite particles become coarse particles and, therefore, may tend to be deteriorated in tinting strength.

The white inorganic particles of the present invention have a BET specific surface area value of usually not less than 0.1 $m^2/g$.

More specifically, the silica particles (1) for the tread rubber composition have a BET specific surface area value of preferably not less than 20 $m^2/g$. When the BET specific surface area value is less than 20 $m^2/g$, the silica particles may tend to be coarse, or sintering may tend to be caused within or between the silica particles, so that the obtained composite particles also tend to be coarse and, therefore, tend to be deteriorated in dispersibility in the tread rubber composition. In the consideration of good dispersibility in the tread rubber composition, the BET specific surface area value of the silica particles (1) for the tread rubber composition is more preferably not less than 25 $m^2/g$, still more preferably not less than 30 $m^2/g$. In the consideration of forming a uniform coating layer composed of the gluing agent, for example, alkoxysilanes or polysiloxanes on the surface of the silica particles, or uniformly coating carbon black onto the surface of the coating layer composed of the gluing agent, the upper limit of the BET specific surface area value of the silica particles (1) for the tread rubber composition is preferably 500 $m^2/g$, more preferably 400 $m^2/g$, still more preferably 300 $m^2/g$.

The white inorganic particles (2) having a refractive index of less than 2.0 and the white inorganic particles (3) having a refractive index of not less than 2.0 respectively have a BET specific surface area value of usually not less than 0.1 m²/g. When the BET specific surface area value is less than 0.1 m²/g, the white inorganic particles (2) having a refractive index of less than 2.0 and the white inorganic particles (3) having a refractive index of not less than 2.0 tend to become coarse, or sintering tend to be caused within or between the white inorganic particles, so that the obtained composite particles also tend to become coarse and, therefore, tend to be deteriorated in tinting strength. In the consideration of good tinting strength of the obtained composite particles, the BET specific surface area value of each of the white inorganic particles (2) having a refractive index of less than 2.0 and the white inorganic particles (3) having a refractive index of not less than 2.0 is preferably not less than 0.3 m²/g, more preferably not less than 0.5 m²/g. In the consideration of forming a uniform gluing agent-coating layer on the surface of the white inorganic particles (2) having a refractive index of less than 2.0 and the white inorganic particles (3) having a refractive index of not less than 2.0, or uniformly coating the black pigments onto the surface of the coating layer composed of the gluing agent, the upper limit of the BET specific surface area value of each of the white inorganic particles (2) having a refractive index of less than 2.0 and the white inorganic particles (3) having a refractive index of not less than 2.0 is usually 500 m²/g, preferably 400 m²/g, more preferably 300 m²/g.

The silica particles (1) have a volume resistivity value of usually not less than $1.0 \times 10^5$ Ω·cm.

As to the hue of each of the white inorganic particles (2) having a refractive index of less than 2.0 and the white inorganic particles (3) having a refractive index of not less than 2.0, the L* value thereof is usually not less than 70.00, preferably not less than 75.00, and the C* value thereof is usually not more than 18.00, preferably not more than 15.00, more preferably not more than 12.00. When the L* value and C* value are out of the above-specified ranges, the white inorganic particles fail to show a sufficient white color, so that it may be difficult to obtain the aimed composite particles of the present invention.

The refractive index of the white inorganic particles (2) having a refractive index of less than 2.0, is more preferably not more than 1.9, still more preferably not more than 1.8 in the consideration of the blackness of the obtained composite particles.

As to the light resistance of each of the white inorganic particles (2) having a refractive index of less than 2.0 and the white inorganic particles (3) having a refractive index of not less than 2.0, the lower limit of the ΔE* value thereof is usually more than 5.0, and the upper limit of the ΔE* value thereof is usually 12.0, preferably 11.0, more preferably 10.0 as measured by the below-mentioned evaluation method.

The white inorganic particles (3) having a refractive index of not less than 2.0 have an ultraviolet light-shielding property of preferably not less than 60%, more preferably not less than 65% as measured by the below-mentioned evaluation method.

The gluing agent used in the present invention may be of any kind as long as the black pigment can be coated onto the surface of the white inorganic particle therethrough. Examples of the preferred gluing agents may include organosilicon compounds such as alkoxysilanes, fluoroalkylsilanes and polysiloxanes; various coupling agents such as silane-based coupling agents, titanate-based coupling agents, aluminate-based coupling agents and zirconate-based coupling agents; oligomer compounds, polymer compounds or the like. These gluing agents may be used alone or in the form of a mixture of any two or more thereof. In the consideration of adhesion strength of the black pigment onto the surface of the white inorganic particle through the gluing agent, the more preferred gluing agents are the organosilicon compounds such as alkoxysilanes, fluoroalkylsilanes and polysiloxanes, and various coupling agents such as silane-based coupling agents, titanate-based coupling agents, aluminate-based coupling agents and zirconate-based coupling agents.

More specifically, in the case where the fine silica particles (1) are used as the core particles, as the gluing agents, there may be suitably used organosilicon compounds or silane-based coupling agents. In particular, the use of the organosilane compounds obtainable from alkoxysilanes represented by the below-mentioned formula (I) is more preferred.

As organosilicon compounds used in the present invention, at least one organosilicon compound selected from the group consisting of (1) organosilane compounds obtained from alkoxysilane compounds; (2) polysiloxanes, or modified polysiloxanes selected from the group consisting of (2-A) polysiloxanes modified with at least one compound selected from the group consisting of polyethers, polyesters and epoxy compounds (hereinafter referred to merely as "modified polysiloxanes"), and (2-B) polysiloxanes whose molecular terminal is modified with at least one group selected from the group consisting of carboxylic acid groups, alcohol groups and a hydroxyl group; and (3) fluoroalkyl organosilane compounds obtained from fluoroalkylsilane compounds.

The organosilane compounds (1) can be produced from alkoxysilane compounds represented by the formula (I):

wherein $R^1$ is $C_6H_5$—, $(CH_3)_2CHCH_2$— or n-$C_bH_{2b+1}$— (wherein b is an integer of 1 to 18); X is $CH_3O$— or $C_2H_5O$—; and a is an integer of 0 to 3.

Specific examples of the alkoxysilane compounds may include methyltriethoxysilane, dimethyldiethoxysilane, phenyltriethyoxysilane, diphenyldiethoxysilane, dimethyldimethoxysilane, methyltrimethoxysilane, phenyltrimethoxysilane, diphenyldimethoxysilane, isobutyltrimethoxysilane, decyltrimethoxysilane or the like. Among these alkoxysilane compounds, in view of the coating and/or adhering effect of the black pigments, methyltriethoxysilane, methyltrimethoxysilane, dimethyldimethoxysilane, isobutyltrimethoxysilane and phenyltriethyoxysilane are preferred, and methyltriethoxysilane, methyltrimethoxysilane, dimethyldimethoxysilane and phenyltriethyoxysilane are more preferred.

As the polysiloxanes (2), there may be used those compounds represented by the formula (II):

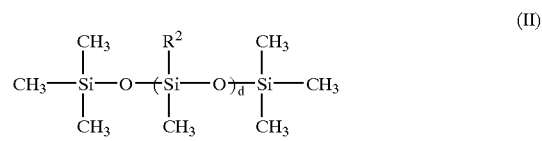

wherein $R^2$ is H— or $CH_3$—, and d is an integer of 15 to 450.

Among these polysiloxanes, in view of the coating and/or adhering effect of the black pigment, polysiloxanes having methyl hydrogen siloxane units are preferred.

As the modified polysiloxanes (2-A), there may be used:

(a1) polysiloxanes modified with polyethers represented by the formula (III):

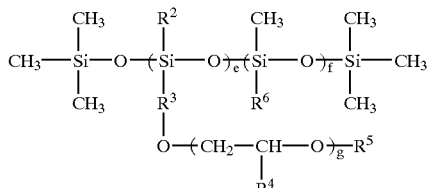

(III)

wherein $R^3$ is $-(-CH_2-)_h-$; $R^4$ is $-(-CH_2-)_i-CH_3$; $R^5$ is $-OH$ $-COOH$, $-CH=CH_2$, $-CH(CH_3)=CH_2$ or $-(-CH_2-)_j-CH_3$; $R^6$ is $-(-CH_2-)_k-CH_3$; g and h are an integer of 1 to 15; i, j and k are an integer of 0 to 15; e is an integer of 1 to 50; and f is an integer of 1 to 300;

(a2) polysiloxanes modified with polyesters represented by the formula (IV):

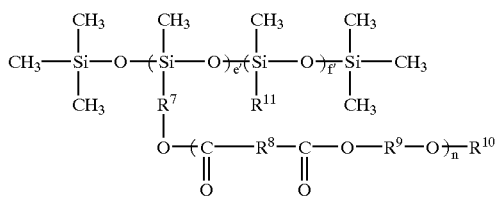

(IV)

wherein $R^7$, $R^8$ and $R^9$ are $-(-CH_2-)_q-$ and may be the same or different; $R^{10}$ is $-OH$, $-COOH$, $-CH=CH_2$, $-CH(CH_3)=CH_2$ or $-(-CH_2-)_r-CH_3$; $R^{11}$ is $-(-CH_2-)_s-CH_3$; n and q are an integer of 1 to 15; r and s are an integer of 0 to 15; e' is an integer of 1 to 50; and f' is an integer of 1 to 300;

(a3) polysiloxanes modified with epoxy compounds represented by the formula (V):

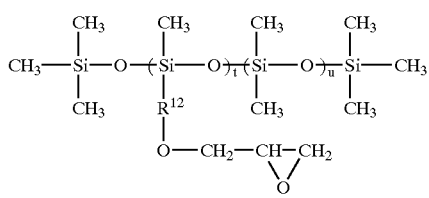

(V)

wherein $R^{12}$ is $-(-CH_2-)_v-$; v is an integer of 1 to 15; t is an integer of 1 to 50; and u is an integer of 1 to 300; or a mixture thereof.

Among these modified polysiloxanes (2-A), in view of the coating and/or adhering effect of the black pigment, the polysiloxanes modified with the polyethers represented by the formula (III), are preferred.

As the terminal-modified polysiloxanes (2-B), there may be used those represented by the formula (VI):

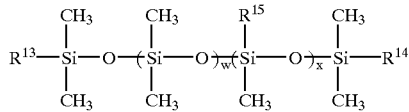

(VI)

wherein $R^{13}$ and $R^{14}$ are $-OH$, $R^{16}OH$ or $R^{17}COOH$ and may be the same or different; $R^{15}$ is $-CH_3$ or $-C_6H_5$; $R^{16}$ and $R^{17}$ are $-(-CH_2-)_y-$; wherein y is an integer of 1 to 15; w is an integer of 1 to 200; and x is an integer of 0 to 100.

Among these terminal-modified polysiloxanes, in view of the coating and/or adhering effect of the black pigment, the polysiloxanes whose terminals are modified with carboxylic acid groups are preferred.

The fluoroalkyl organosilane compounds (3) may be produced from fluoroalkylsilane compounds represented by the formula (VII):

$$CF_3(CF_2)_zCH_2CH_2(R^{18})_{a'}SiX_{4-a'}$$ (VII)

wherein $R^{18}$ is $CH_3-$, $C_2H_5-$, $CH_3O-$ or $C_2H_5O-$; X is $CH_3O-$ or $C_2H_5O-$; and z is an integer of 0 to 15; and a' is an integer of 0 to 3.

Specific examples of the fluoroalkylsilane compounds may include trifluoropropyl trimethoxysilane, tridecafluorooctyl trimethoxysilane, heptadecafluorodecyl trimethoxysilane, heptadecafluorodecylmethyl dimethoxysilane, trifluoropropyl triethoxysilane, tridecafluorooctyl triethoxysilane, heptadecafluorodecyl triethoxysilane, or the like. Among these fluoroalkylsilane compounds, in view of the coating and/or adhering effect of the black pigment, trifluoropropyl trimethoxysilane, tridecafluorooctyl trimethoxysilane and heptadecafluorodecyl trimethoxysilane are preferred, and trifluoropropyl trimethoxysilane and tridecafluorooctyl trimethoxysilane are more preferred.

As the silane-based coupling agents, there may be exemplified vinyltrimethoxysilane, vinyltriethoxysilane, γ-aminopropyltriethoxysilane, γ-glycidoxypropyltrimethoxysilane, γ-mercaptopropyltrimethoxysilane, γ-methacryloxypropyltrimethoxysilane, N-β(aminoethyl)-γ-aminopropyltrimethoxysilane, γ-glycidoxypropylmethyldimethoxysilane, γ-chloropropyltrimethoxysilane or the like.

As the titanate-based coupling agents, there may be exemplified isopropyltristearoyl titanate, isopropyltris(dioctylpyrophosphate)titanate, isopropyltri(N-aminoethyl-aminoethyl)titanate, tetraoctylbis(ditridecylphosphate) titanate, tetra(2,2-diaryloxymethyl-1-butyl)bis(ditridecyl) phosphate titanate, bis(dioctylpyrophosphate)oxyacetate titanate, bis(dioctylpyrophosphate)ethylene titanate or the like.

As the aluminate-based coupling agents, there may be exemplified acetoalkoxyaluminum diisopropilate, aluminumdiisopropoxymonoethylacetoacetate, aluminumtrisethylacetoacetate, aluminumtrisacetylacetonate or the like.

As the zirconate-based coupling agents, there may be exemplified zirconiumtetrakisacetylacetonate, zirconiumdibutoxybisacetylacetonate, zirconiumtetrakisethylacetoacetate, zirconiumtributoxymonoethylacetoacetate, zirconiumtributoxyacetylacetonate or the like.

It is preferred to use oligomer compounds having a molecular weight of from 300 to less than 10,000. It is preferred to use polymer compounds having a molecular weight of about 10,000 to about 100,000. In the consideration of forming a uniform coating layer on the white inorganic particles, the oligomers or polymer compounds are preferably in a liquid state, or soluble in water or various solvents.

The amount of the gluing agent-coating layer is preferably 0.01 to 15.0% by weight, more preferably 0.02 to 12.5% by weight, still more preferably 0.03 to 10.0% by weight (calculated as C) based on the weight of the gluing agent-coated white inorganic particles.

When the amount of the gluing agent-coating layer is less than 0.01% by weight, it may be difficult to coat and/or adhere not less than one part by weight of the black pigment onto 100 parts by weight of the white inorganic particles. When the amount of the gluing agent-coating layer is more than 15.0% by weight, since it is possible to coat and/or adhere 1 to 500 parts by weight of the black pigment onto 100 parts by weight of the white inorganic particles therethrough, it is unnecessary to form the gluing agent-coating layer in an amount of more than 15.0% by weight.

The black pigments usable in the present invention, include usually aniline black and carbon black. Especially, as the black pigment for the tread rubber composition using the silica particles (1), carbon black is usable in order to reduce the electric resistance. Examples of the carbon black may include furnace black, channel black, acetylene black or the like.

In the present invention, in order to impart a clear black color to the composite particles, the above black pigments may be used in combination with the other organic pigments. Examples of the other organic pigments may include organic blue-based pigments comprising phthalocyanine-based pigments such as metal-free phthalocyanine blue, phthalocyanine blue and fast sky blue. In case where total amount of the black pigments and the other organic pigments does not exceed 500 parts by weight based on 100 parts by weight of the white inorganic particles as core particles, the amount of the other organic pigments is preferably not more than 490 parts by weight based on 100 parts by weight of the white inorganic particles as core particles.

The total amount of the black pigments coated is usually 1 to 500 parts by weight based on 100 parts by weight of the core particles.

More specifically, the amount of carbon black coated onto the silica particles (1) for the tread rubber composition is usually 1 to 500 parts by weight, preferably 30 to 500 parts by weight, more preferably 50 to 500 parts by weight based on 100 parts by weight of the silica particles (1).

When the amount of carbon black coated onto the silica particles (1) is less than 1 part by weight, it may be difficult to obtain composite particles having a sufficiently low volume resistivity value and a sufficient blackness because of too small amount of carbon black coated.

When the amount of carbon black coated onto the silica particles (1) is more than 500 parts by weight, although it is possible to obtain a black composite particles having sufficient blackness and volume resistivity value, the carbon black may tend to be desorbed from the silica particles because of too large amount of the carbon black coated. As a result, the obtained composite particles may tend to be deteriorated in dispersibility in the tread rubber composition.

The amount of the black pigments coated and/or adhered onto each of the white inorganic particles (2) having a refractive index of less than 2.0 and the white inorganic particles (3) having a refractive index of not less than 2.0, is preferably 1 to 500 parts by weight, more preferably 2 to 400 parts by weight, still more preferably 5 to 300 parts by weight based on 100 parts by weight of the respective white inorganic particles.

When the amount of the black pigments coated onto the white inorganic particles (2) or the white inorganic particles (3) is less than 1 part by weight or more than 500 parts by weight, it may be difficult to obtain the aimed composite particles of the present invention.

The shape and size of the composite particles according to the present invention may vary depending upon those of the white inorganic particles as core particles. The composite particles have a particle configuration similar to that of the core particles.

Namely, the composite particles of the present invention have an average particle diameter of usually 0.001 to 12.0 $\mu$m.

More specifically, in the case where the silica particles (1) are used as core particles, the average particle diameter of the obtained composite particles is preferably 0.001 to 0.50 $\mu$m, more preferably 0.002 to 0.45 $\mu$m, still more preferably 0.003 to 0.40 $\mu$m.

When the average particle diameter of the composite particles produced by using the silica particles (1) as core particles is more than 0.50 $\mu$m, it may be difficult to uniformly disperse such composite particles in the tread rubber composition because of too large particle size thereof. When the average particle diameter thereof is less than 0.001 $\mu$m, the obtained composite particles tend to be agglomerated together by the increase of intermolecular force therebetween due to fine particles, so that it may be difficult to uniformly disperse the composite particles in the tread rubber composition.

In the case where the white inorganic particles (2) having a refractive index of less than 2.0 or the white inorganic particles (3) having a refractive index of not less than 2.0 are used as core particles, the average particle diameter of the obtained composite particles is usually 0.001 to 12.0 $\mu$m, preferably 0.0015 to 11.0 $\mu$m, more preferably 0.002 to 10.0 $\mu$m.

When the average particle diameter of the composite particles produced by using the white inorganic particles (2) or the white inorganic particles (3) as core particles is more than 12.0 $\mu$m, the obtained composite particles may tend to be deteriorated in tinting strength because of too large particle size thereof. When the average particle diameter of the composite particles produced by using the white inorganic particles (2) or the white inorganic particles (3) as core particles are less than 0.001 $\mu$m, it may be difficult to uniformly disperse such particles in vehicle.

The composite particles of the present invention have a BET specific surface area value of usually 0.5 to 500 $m^2/g$.

More specifically, the composite particles produced by using the silica particles (1) as core particles, have a BET specific surface area value of preferably 20 to 500 $m^2/g$, more preferably 25 to 400 $m^2/g$, still more preferably 30 to 300 $m^2/g$. When the BET specific surface area value thereof is less than 20 $m^2/g$, the obtained composite particles may tend to become coarse, or sintering may tend to be caused within or between the particles, so that it may be difficult to uniformly disperse such particles in the tread rubber composition. When the BET specific surface area value thereof is more than 500 $m^2/g$, the obtained composite particles tend to be agglomerated together by the increase of intermolecular force therebetween due to fine particles, so that it may be difficult to uniformly disperse the composite particles in the tread rubber composition.

The composite particles produced by using the white inorganic particles (2) having a refractive index of less than 2.0 or the white inorganic particles (3) having a refractive index of not less than 2.0 as core particles according to the present invention, have a BET specific surface area value of usually 0.5 to 500 m$^2$/g, preferably 1.0 to 400 m$^2$/g, more preferably 1.5 to 300 m$^2$/g. When the BET specific surface area value thereof is less than 0.5 m$^2$/g, the obtained composite particles may tend to become coarse, or sintering may tend to be caused within or between the particles, resulting in poor tinting strength.

The composite particles produced by using carbon black as the black pigments according to the present invention have a volume resistivity value of usually less than $1.0 \times 10^7$ Ω·cm, and the composite particles produced by using aniline black as the black pigments according to the present invention have a volume resistivity value of usually not less than $1.0 \times 10^6$ Ω·cm.

More specifically, in the case where carbon black is used as the black pigments, the composite particles produced by using the silica particles (1) as core particles, have a volume resistivity value of preferably less than $1.0 \times 10^5$ Ω·cm, more preferably not more than $5.0 \times 10^4$ Ω·cm, still more preferably not more than $1.0 \times 10^4$ Ω·cm. When the volume resistivity value thereof is not less than $1.0 \times 10^5$ Ω·cm, it may be difficult to sufficiently reduce the volume resistivity value of the obtained tread rubber composition. The lower limit of the volume resistivity value of the composite particles produced by using the silica particles (1) as core particles, is preferably $1.0 \times 10$ Ω·cm.

In the case where carbon black is used as the black pigments, the composite particles produced by using the white inorganic particles (2) having a refractive index of less than 2.0 or the white inorganic particles (3) having a refractive index of not less than 2.0 as core particles according to the present invention, have a volume resistivity value of usually less than $1.0 \times 10^7$ Ω·cm, preferably not more than $5.0 \times 10^6$ Ω·cm, more preferably not more than $1.0 \times 10^6$ Ω·cm. In the case where aniline black is used as the black pigments, the composite particles produced by using the white inorganic particles (2) or the white inorganic particles (3) as core particles, have a volume resistivity value of usually not less than $1.0 \times 10^6$ Ω·cm, preferably not less than $5.0 \times 10^6$ Ω·cm, more preferably not less than $1.0 \times 10^7$ Ω·cm.

As to the blackness of the composite particles produced by using the silica particles (1) as core particles, the L* value thereof is preferably not more than 22.0, more preferably not more than 21.0, most preferably not more than 20.0. When the L* value thereof is more than 22.0, the obtained composite particles exhibit a too high brightness and, therefore, may fail to show an excellent blackness. The lower limit of the L* value is preferably 14.5.

As to the blackness of the composite particles produced by using the white inorganic particles (2) having a refractive index of less than 2.0 as core particles, the L* value thereof is preferably not more than 30.0, more preferably not more than 29.0, still more preferably not more than 28.0. When the L* value thereof is more than 30.0, the obtained composite particles exhibit a too high brightness and, therefore, may fail to show an excellent blackness. The lower limit of the L* value is preferably 14.5.

As to the hue of the composite particles produced by using the white inorganic particles (3) having a refractive index of not less than 2.0 as core particles, the L* value thereof is usually not more than 90.0, preferably not more than 80.0, more preferably not more than 70.0. The lower limit of the L* value is preferably 14.5.

As to the light resistance of the composite particles according to the present invention, the ΔE* value thereof is preferably not more than 5.0, more preferably not more than 4.0 as measured by the below-mentioned evaluation method.

The desorption percentage of the black pigments from the composite particles of the present invention is preferably not more than 20%, more preferably not more than 15%. When the desorption percentage of the black pigments from the composite particles is more than 20%, the composite particles may tend to be inhibited from being uniformly dispersed in the vehicle or tread rubber composition, by the existence of the desorbed black pigments.

The composite particles produced by using the white inorganic particles (2) having a refractive index of less than 2.0 or the white inorganic particles (3) having a refractive index of not less than 2.0 as core particles according to the present invention, have a tinting strength of preferably not less than 110%, more preferably not less than 115%, still more preferably not less than 120% as measured by the below-mentioned evaluation method.

The composite particles produced by using the white inorganic particles (2) having a refractive index of less than 2.0 or the white inorganic particles (3) having a refractive index of not less than 2.0 as core particles according to the present invention, have a repose angle of preferably not more than 45°, more preferably not more than 40°.

The composite particles produced by using the white inorganic particles (2) having a refractive index of less than 2.0 or the white inorganic particles (3) having a refractive index of not less than 2.0 as core particles according to the present invention, have a surface activity of preferably not more than 2%, more preferably not more than 1.5% as measured by the below-mentioned evaluation method.

The composite particles produced by using the white inorganic particles (3) having a refractive index of not less than 2.0 as core particles according to the present invention, have an ultraviolet light-shielding property of preferably not less than 80%, more preferably not less than 85% as measured by the below-mentioned evaluation method.

In the composite particles according to the present invention, if required, the surface of the white inorganic particle may be previously coated with at least one compound selected from the group consisting of hydroxides of aluminum, oxides of aluminum, hydroxides of silicon and oxides of silicon (hereinafter referred to as "hydroxides and/or oxides of aluminum and/or silicon"). The composite particles produced by using the white inorganic particles having the hydroxides and/or oxides of aluminum and/or silicon coat as core particles, can be more effectively prevented from undergoing desorption of black pigment from the surface of the white inorganic particle, and can exhibit a higher light resistance, as compared to composite particles produced by using the white inorganic particles having no hydroxides and/or oxides of aluminum and/or silicon coat.

The amount of the hydroxides and/or oxides of aluminum and/or silicon coat is 0.01 to 20% by weight (calculated as Al, SiO$_2$ or sum of Al and SiO$_2$) based on the weight of the white inorganic particles coated with the hydroxides and/or oxides of aluminum and/or silicon.

When the amount of the hydroxides and/or oxides of aluminum and/or silicon coat is less than 0.01% by weight, it may be difficult to attain the improved effect of reducing the desorption percentage of black pigment and the improved effect of enhancing the light resistance. As long as the amount of the hydroxides and/or oxides of aluminum and/or silicon coat is in the range of 0.01 to 20% by weight, the improved effect of reducing the desorption percentage of black pigment and the improved effect of enhancing the light resistance can be sufficiently attained. Therefore, it is unnecessary to form the hydroxides and/or oxides of aluminum and/or silicon coat in an amount of more than 20% by weight.

The composite particles produced by using as core particles, the white inorganic particles coated with hydroxides and/or oxides of aluminum and/or silicon according to the present invention, are substantially the same in particle size, BET specific surface area value, blackness, tinting strength and volume resistivity value as those of the composite particles produced by using the white inorganic particles having no hydroxides and/or oxides of aluminum and/or silicon coat according to the present invention. The desorption percentage of the black pigments from the composite particles as well as the light resistance thereof can be improved by forming the hydroxides and/or oxides of aluminum and/or silicon coat on the white inorganic particles. Specifically, by forming such an hydroxides and/or oxides of aluminum and/or silicon coat on the white inorganic particles as core particles, the properties of the obtained composite particles can be improved such that the desorption percentage of the black pigments therefrom is preferably not more than 15%, more preferably not more than 10%, and as to the light resistance, the $\Delta E^*$ value thereof is usually not more than 4.0, preferably not more than 3.0.

When the silica particles (1) are used as the core particles, the surface of the obtained composite particles may be further coated, if required, with a fatty acid, a metal salt of fatty acid or a silane-based coupling agent. The composite particles coated with the fatty acid, the metal salt of fatty acid or the silane-based coupling agent are enhanced in dispersibility in the tread rubber composition as compared to uncoated composite particles.

Examples of the fatty acid used in the present invention may include saturated or unsaturated fatty acids. Among these fatty acids, those having 12 to 22 carbon atoms are preferred.

Examples of the metal salt of fatty acid used in the present invention may include metal salts of saturated or unsaturated fatty acids, more preferably metal salts of a fatty acid having 12 to 18 carbon atoms, and a metal selected from the group consisting of alkali earth metals such as magnesium, calcium, strontium and barium, alkali metals such as lithium, sodium and potassium, zinc, aluminum, copper, iron, lead and tin. In the consideration of good dispersibility in the tread rubber composition, alkali earth metal salts of stearic acid and zinc stearate are preferred.

The silane-based coupling agent used in the present invention may be selected from those ordinarily blended in rubbers. Specific examples of the silane-based coupling agent may include vinyl trichlorosilane, vinyl trimethoxysilane, vinyl triethoxysilane, vinyl tris(β-methoxyethoxy)silane, β-(3,4-epoxycyclohexy)ethyl trimethoxysilane, γ-glycidoxypropyl trimethoxysilane, γ-glycidoxypropylmethyl dimethoxysilane, γ-methacryloxypropyl trimethoxysilane, N-β-(aminoethyl)-γ-aminopropylmethyl dimethoxysilane, N-β-(aminoethyl)-γ-aminopropyl trimethoxysilane, N-phenyl-γ-aminopropyl trimethoxysilane, γ-aminopropyl trimethoxysilane, γ-aminopropyl triethoxysilane, γ-chloropropyl trimethoxysilane, γ-mercaptopropyl trimethoxysilane, bis(3-(trimethoxysilyl)propyl)tetrasulfene, γ-trimethoxysilylpropyl dimethylthiocarbamyl tetrasulfene, γ-trimethoxysilylpropyl benzothiazyl tetrasulfene or the like.

In the consideration of good reinforcing effect in the tread rubber composition, as the silane-based coupling agent, there may be used those having a functional group capable of reacting with a carbon-carbon double bond of the rubber such as polysulfide group, mercapto group and epoxy group. Specific examples of the silane-based coupling agents having a polysulfide group may include bis(3-(trimethoxysilyl) propyl) tetrasulfene, γ-trimethoxysilylpropyl dimethylthiocarbamyl tetrasulfene, γ-trimethoxysilylpropyl benzothiazyl tetrasulfene or the like. Specific examples of the silane-based coupling agents having a mercapto group may include γ-mercaptopropyl trimethoxysilane or the like. Specific examples of the silane-based coupling agents having an epoxy group may include β-(3,4-epoxycyclohexy)ethyl trimethoxysilane, γ-glycidoxypropyl trimethoxysilane or the like.

The coating amount of the fatty acid, metal salt of fatty acid or silane-based coupling agent is preferably 0.1 to 10.0% by weight, more preferably 0.2 to 7.5% by weight, still more preferably 0.3 to 5.0% by weight (calculated as C) based on the weight of the composite particles coated with the fatty acid, metal salt of fatty acid or silane-based coupling agent.

When the coating amount of the fatty acid, metal salt of fatty acid or silane-based coupling agent is less than 0.1% by weight, it may be difficult to improve the dispersibility of the composite particles in the tread rubber composition. When the coating amount of the fatty acid, metal salt of fatty acid or silane-based coupling agent is more than 10.0% by weight, the effect of improving the dispersibility in the tread rubber composition is already saturated and, therefore, the coating with such a large amount of the fatty acid, metal salt of fatty acid or silane-based coupling agent is unnecessary and meaningless.

The composite particles coated with the fatty acid, metal salt of fatty acid or silane-based coupling agent which are produced by using the silica particles (1) as core particles, are substantially the same in particle size, BET specific surface area value, volume resistivity value, blackness, light resistance and carbon black desorption percentage as those of the uncoated composite particles produced by using the silica particles (1) as core particles according to the present invention.

Next, the tread rubber composition containing the composite particles produced by using the silica particles (1) as core particles according to the present invention, is described.

The tread rubber composition containing as a filler the black composite particles produced by using the silica particles (1) as core particles according to the present invention, exhibits a dispersion condition of Rank 4 or 5, preferably Rank 5; a wear resistance of preferably not less than 103, more preferably not less than 105 (as relative value); a volume resistivity value of preferably not more than $1.0 \times 10^5$ Ω·cm, more preferably not more than $5.0 \times 10^4$ Ω·cm; a tensile strength of preferably not less than 23.0 MPa, more preferably not less than 23.5 MPa; and a light resistance ($\Delta E^*$ value) of preferably not more than 5.0, more preferably not more than 4.5, still more preferably not more than 4.0.

The tread rubber composition containing as a filler the black composite particles produced by using the silica particles (1) as core particles, which black composite particles is coated with the fatty acid, metal salt of fatty acid or silane-based coupling agent according to the present invention, exhibits a dispersion condition of preferably Rank 5; a wear resistance of preferably not less than 105, more preferably not less than 107 (as relative value); a volume resistivity value of preferably not more than $1.0\times10^5$ Ω·cm, more preferably not more than $5.0\times10^4$ Ω·cm; a tensile strength of preferably not less than 23.5 MPa, more preferably not less than 24.0 MPa; and a light resistance (ΔE* value) of preferably not more than 4.5, more preferably not more than 4.0, still more preferably not more than 3.5.

The tread rubber composition containing as a filler the black composite particles produced by using the silica particles (1) as core particles, which silica particles coated with at least one compound selected from the group consisting of hydroxides of aluminum, oxides of aluminum, hydroxides of silicon and oxides of silicon, according to the present invention, exhibits a dispersion condition of preferably Rank 5; a wear resistance of preferably not less than 105, more preferably not less than 107 (as relative value); a volume resistivity value of preferably not more than $1.0\times10^5$ Ω·cm, more preferably not more than $5.0\times10^4$ Ω·cm; a tensile strength of preferably not less than 23.5 MPa, more preferably not less than 24.0 MPa; and a light resistance (ΔE* value) of preferably not more than 4.5, more preferably not more than 4.0, still more preferably not more than 3.5.

In the tread rubber composition of the present invention, the black composite particles may be blended in an amount of usually 10 to 200 parts by weight based on 100 parts by weight of the rubber component contained in the composition. In the consideration of good handling property of the tread rubber composition, the amount of the black composite particles blended is preferably 15 to 150 parts by weight, more preferably 20 to 100 parts by weight based on 100 parts by weight of the rubber component.

In addition to the composite particles and known rubber components, the tread rubber composition of the present invention may further contain, if required, various additives ordinarily used in tread rubber compositions such as curing agent, curing promoter, coupling agent, filler, plasticizer, anti-aging agent and the like.

As the rubber component, there may be used natural rubber (NR), polyisoprene rubber (IR), styrene-butadiene copolymer rubber (SBR), polybutadiene rubber (BR), butyl rubber (IIR), halogenated butyl rubber (X-IIR), acrylonitrile-butadiene rubber (NBR), chloroprene rubber, ethylene-propylene copolymer rubber, ethylene-propylene-diene copolymer rubber, styrene-isoprene copolymer rubber, styrene-isoprene-butadiene copolymer rubber, isoprene-butadiene copolymer rubber, chloro-sulfonated polyethylene, acrylic rubber, epichlorohydrin rubber, polysulfide rubber, silicone rubber, fluorine-contained rubber, urethane rubber, or mixtures thereof. The rubber component of the tread rubber composition preferably contains as a main component, a diene-based rubber such as natural rubber (NR), polyisoprene rubber (IR), styrene-butadiene copolymer rubber (SBR), polybutadiene rubber (BR), butyl rubber (IIR), halogenated butyl rubber (X-IIR) and acrylonitrile-butadiene rubber (NBR).

The tread rubber composition of the present invention can be produced by kneading the above rubber component and the black composite particles, if required, together with various additives, by a known method using a Banbury mixer, a mixing roll or the like, and then vulcanizing the resultant kneaded material at a temperature of usually 120 to 180° C.

Next, the paint containing the composite particles using the white inorganic particles (2) having a refractive index of less than 2.0 or the white inorganic particles (3) having a refractive index of not less than 2.0 according to the present invention is described.

The solvent-based paint containing the black composite particles produced by using the white inorganic particles (2) having a refractive index of less than 2.0 as core particles according to the present invention, exhibits a storage stability (ΔE* value) of preferably not more than 1.5, more preferably not more than 1.2. As to the blackness of a coating film formed from the solvent-based paint, the L* value thereof is preferably not more than 30.0, more preferably not more than 29.0, still more preferably not more than 28.0, and the lower limit of the L* value is preferably 14.5. The coating film formed from the solvent-based paint further has a gloss of preferably 75 to 110%, more preferably 80 to 110%; and a light resistance (ΔE* value) of preferably not more than 5.0, more preferably not more than 4.0.

The solvent-based paint containing the black composite particles produced by using as core particles, the white inorganic particles (2) having a refractive index of less than 2.0, which are coated with at least one compound selected from the group consisting of hydroxides of aluminum, oxides of aluminum, hydroxides of silicon and oxides of silicon, exhibits a storage stability (ΔE* value) of preferably not more than 1.5, more preferably not more than 1.2. As to the blackness of a coating film formed from the solvent-based paint, the L* value thereof is preferably not more than 30.0, more preferably not more than 29.0, still more preferably not more than 28.0, and the lower limit of the L* value is preferably 14.5. The coating film formed from the solvent-based paint further has a gloss of preferably 80 to 115%, more preferably 85 to 115%; and a light resistance (ΔE* value) of preferably not more than 4.0, more preferably not more than 3.0.

The water-based paint containing the black composite particles produced by using the white inorganic particles (2) having a refractive index of less than 2.0 as core particles, exhibits a storage stability (ΔE* value) of preferably not more than 1.5, more preferably not more than 1.2. As to the blackness of a coating film formed from the water-based paint, the L* value thereof is preferably not more than 30.0, more preferably not more than 29.0, still more preferably not more than 28.0, and the lower limit of the L* value is preferably 14.5. The coating film formed from the water-based paint further has a gloss of preferably 70 to 110%, more preferably 75 to 110%; and a light resistance (ΔE* value) of preferably not more than 5.0, more preferably not more than 4.0.

The water-based paint containing the black composite particles produced by using as core particles, the white inorganic particles (2) having a refractive index of less than 2.0, which are coated with at least one compound selected from the group consisting of hydroxides of aluminum, oxides of aluminum, hydroxides of silicon and oxides of silicon, exhibits a storage stability (ΔE* value) of preferably not more than 1.5, more preferably not more than 1.2. As to the blackness of a coating film formed from the water-based paint, the L* value thereof is preferably not more than 30.0, more preferably not more than 29.0, still more preferably not more than 28.0, and the lower limit of the L* value is preferably 14.5. The coating film formed from the water-based paint further has a gloss of preferably 75 to 115%, more preferably 80 to 115%; and a light resistance (ΔE* value) of preferably not more than 4.0, more preferably not more than 3.0.

The solvent-based paint containing the composite particles produced by using the white inorganic particles (3) having a refractive index of not less than 2.0 as core particles, exhibits a storage stability (ΔE* value) of preferably not more than 1.5. more preferably not more than 1.2.

The coating film formed from the above solvent-based paint has a gloss of preferably 75 to 110%, more preferably 80 to 110%; a light resistance (ΔE* value) of preferably not more than 5.0, more preferably not more than 4.0. As to the hue of the coating film-formed from the above solvent-based paint, the L* value thereof is preferably not more than 90.0, more preferably not more than 80.0, still more preferably not more than 70.0, and the lower limit of the L* value is preferably 14.5.

The solvent-based paint containing the composite particles produced by using as core particles, the white inorganic particles (3) having a refractive index of not less than 2.0, which are coated with at least one compound selected from the group consisting of hydroxides of aluminum, oxides of aluminum, hydroxides of silicon and oxides of silicon, exhibits a storage stability (ΔE* value) of preferably not more than 1.5, more preferably not more than 1.2. The coating film formed from the above solvent-based paint has a gloss of preferably 80 to 115%, more preferably 85 to 115%; a light resistance (ΔE* value) of preferably not more than 4.0, more preferably not more than 3.0. As to the hue of the coating film formed from the above solvent-based paint, the L* value thereof is preferably not more than 90.0, more preferably not more than 80.0, still more preferably not more than 70.0, and the lower limit of the L* value is preferably 14.5.

The water-based paint containing the composite particles produced by using the white inorganic particles (3) having a refractive index of not less than 2.0 as core particles, exhibits a storage stability (ΔE* value) of preferably not more than 1.5, more preferably not more than 1.2. The coating film formed from the above water-based paint has a gloss of preferably 70 to 110%, more preferably 75 to 110%; a light resistance (ΔE* value) of preferably not more than 5.0, more preferably not more than 4.0. As to the hue of the coating film formed from the above water-based paint, the L* value thereof is preferably not more than 90.0, more preferably not more than 80.0, still more preferably not more than 70.0, and the lower limit of the L* value is preferably 14.5.

The water-based paint containing the composite particles produced by using as core particles, the white inorganic particles (3) having a refractive index of not less than 2.0, which are coated with at least one compound selected from the group consisting of hydroxides of aluminum, oxides of aluminum, hydroxides of silicon and oxides of silicon, exhibits a storage stability (ΔE* value) of preferably not more than 1.5, more preferably not more than 1.2. The coating film formed from the above water-based paint has a gloss of preferably 75 to 115%, more preferably 80 to 115%; a light resistance (ΔE* value) of preferably not more than 4.0, more preferably not more than 3.0. As to the hue of the coating film formed from the above water-based paint, the L* value thereof is preferably not more than 90.0, more preferably not more than 80.0, still more preferably not more than 70.0, and the lower limit of the L* value is preferably 14.5.

The amount of the composite particles blended in the paint according to the present invention is in the range of usually 0.5 to 100 parts by weight based on 100 parts by weight of a paint base material. In the consideration of handling of the paint, the amount of the composite particles blended in the paint is preferably 1.0 to 100 parts by weight based on 100 parts by weight of the paint base material.

The paint base material comprises a resin and a solvent, and may further contain, if required, oil and fats, a defoamer, an extender pigment, a drying agent, a surfactant, a hardening accelerator, an assistant, or the like.

Examples of the resin used in the paint base material may include resins ordinarily used for solvent-based paints or oil-based printing inks such as acrylic resins, alkyd resins, polyester resins, polyurethane resins, epoxy resins, phenol resins, melamine resins, amino resins, vinyl chloride resins, silicone resins, rosin-based resins such as gum rosin and lime rosin, maleic acid resins, polyamide resins, nitrocellulose, ethylene-vinyl acetate copolymer resins, rosin-modified resins such as rosin-modified phenol resins and rosin-modified maleic acid resins, petroleum resins or the like. Examples of the resins used in the paint base material for water-based paints may include resins ordinarily used for water-based paints or water-based inks such as water-soluble acrylic resins, water-soluble styrene-maleic acid resins, water-soluble alkyd resins, water-soluble melamine resins, water-soluble urethane emulsion resins, water-soluble epoxy resins, water-soluble polyester resins or the like.

As the solvent for solvent-based paints, there may be exemplified those solvents ordinarily used for solvent-based paints such as soybean oil, toluene, xylene, thinner, butyl acetate, methyl acetate, methyl isobutyl ketone, glycol ether-based solvents such as methyl cellosolve, ethyl cellosolve, propyl cellosolve, butyl cellosolve and propylene glycol monomethyl ether, ester-based solvents such as ethyl acetate, butyl acetate and amyl acetate, aliphatic hydrocarbon-based solvents such as hexane, heptane and octane, alicyclic hydrocarbon-based solvents such as cyclohexane, petroleum-based solvents such as mineral spirits, ketone-based solvents such as acetone and methyl ethyl ketone, alcohol-based solvents such as methyl alcohol, ethyl alcohol, propyl alcohol and butyl alcohol, aliphatic hydrocarbons or the like.

As the solvents for water-based paints, there may be used a mixture of water and a water-soluble organic solvent ordinarily used for water-based paints such as alcohol-based solvents such as ethyl alcohol, propyl alcohol and butyl alcohol, glycol ether-based solvents such as methyl cellosolve, ethyl cellosolve, propyl cellosolve and butyl cellosolve, oxyethylene or oxypropylene addition polymers such as diethylene glycol, triethylene glycol, polyethylene glycol, dipropylene glycol, tripropylene glycol and polypropylene glycol, alkylene glycols such as ethylene glycol, propylene glycol and 1,2,6-hexanetriol, glycerin, 2-pyrolidone or the like As the fats and oils, there may be used boiled oils obtained by processing drying oils such as linseed oil, tung oil, oiticica oil and safflower oil.

As the defoamer, there may be used commercially available products such as "NOPCO 8034 (tradename)", "SN DEFOAMER 477 (tradename)", "SN DEFOAMER 5013 (tradename)", "SN DEFOAMER 247 (tradename)" and "SN DEFOAMER 382 (tradename)" (all produced by SUN NOPCO CO., LTD.), "ANTI-FOAM 08 (tradename)" and "EMARGEN 903 (tradename)" (both produced by KAO CO., LTD.), or the like.

Next, the resin composition containing the composite particles according to the present invention is described.

The resin composition containing the black composite particles produced by using the white inorganic particles (2) having a refractive index of less than 2.0 as core particles according to the present invention, exhibits a blackness (L* value) of preferably not more than 30.0, more preferably not more than 29.0, still more preferably not more than 28.0 provided that the lower limit of the L* value is preferably 14.5; a dispersing condition of Rank 4 or 5, preferably Rank 5 as evaluated by the below-mentioned method; a light resistance (ΔE* value) of preferably not more than 5.0, more preferably not more than 4.0; and an anti-aging property (percentage of discolored portion after heating at 190° C. for 120 minutes) of preferably mot more than 15%, more preferably not more than 10%, still more preferably not more than 5%.

The resin composition containing the black composite particles produced by using as core particles the white inorganic particles (2) having a refractive index of less than 2.0, which are coated with at least one compound selected from the group consisting of hydroxides of aluminum, oxides of aluminum, hydroxides of silicon and oxides of silicon according to the present invention, exhibits a blackness (L* value) of preferably not more than 30.0, more preferably not more than 29.0, still more preferably not more than 28.0 provided that the lower limit of the L* value is preferably 14.5; a dispersing condition of Rank 4 or 5, preferably Rank 5 as evaluated by the below-mentioned method; a light resistance (ΔE* value) of preferably not more than 4.0, more preferably not more than 3.0; and an anti-aging property (percentage of discolored portion after heating at 190° C. for 120 minutes) of preferably mot more than 15%, more preferably not more than 10%, still more preferably not more than 5%.

The resin composition containing the composite particles produced by using the white inorganic particles (3) having a refractive index of not less than 2.0 as core particles according to the present invention, exhibits a dispersing condition of preferably Rank 4 or 5, more preferably Rank 5 as evaluated by the below-mentioned method; a light resistance (ΔE* value) of preferably not more than 5.0, more preferably not more than 4.0; and an anti-aging property (percentage of discolored portion after heating at 190° C. for 120 minutes) of preferably mot more than 15%, more preferably not more than 10%, still more preferably not more than 5%. As to the hue of the above resin composition, the L* value thereof is preferably not more than 90.0, more preferably not more than 80.0, still more preferably not more than 70.0, and the lower limit of the L* value is preferably 14.5.

The resin composition containing the composite particles produced by using as core particles the white inorganic particles (3) having a refractive index of not less than 2.0, which are coated with at least one compound selected from the group consisting of hydroxides of aluminum, oxides of aluminum, hydroxides of silicon and oxides of silicon according to the present invention, a dispersing condition of Rank 4 or 5, preferably Rank 5 as evaluated by the below-mentioned method; a light resistance (ΔE* value) of preferably not more than 4.0, more preferably not more than 3.0; and an anti-aging property (percentage of discolored portion after heating at 190° C. for 120 minutes) of preferably mot more than 15%, more preferably not more than 10%, still more preferably not more than 5%; exhibits a blackness (L* value) of preferably not more than 90.0, more preferably not more than 80.0, still more preferably not more than 70.0 provided that the lower limit of the L* value is preferably 14.5.

The amount of the composite particles blended in the resin composition according to the present invention is usually in the range of 0.01 to 200 parts by weight based on 100 parts by weight of resins contained in the composition. In the consideration of handling of the resin composition, the amount of the composite particles blended therein is preferably 0.05 to 150 parts by weight, more preferably 0.1 to 100 parts by weight based on 100 parts by weight of the resins.

The base material of the resin composition according to the present invention comprises the composite particles and known thermoplastic resins, and may further contain, if required, additives such as lubricants, plasticizers, antioxidants, ultraviolet light absorbers, various stabilizers or the like.

As the reins, there may be used polyolefins such as polyethylene, polypropylene, polybutene and polyisobutylene; thermoplastic resins such as polyvinyl chloride, polymethyl pentene, polyethylene terephthalate, polybutylene terephthalate, polystyrene, styrene-acrylic ester copolymers, styrene-vinyl acetate copolymers, acrylonitrile-butadiene-styrene copolymers, acrylonitrile-EPDM-styrene copolymers, acrylic resins, polyamides, polycarbonates, polyacetals and polyurethanes; rosin-modified maleic acid resins; phenol resins; epoxy resins; polyester resins; silicone resins; rosin-esters; rosins; natural rubbers, synthetic rubbers; or the like.

The additives may be added in an amount of usually not more than 50% by weight based on the total amount of the composite particles and the resin. When the amount of the additives added is more than 50% by weight, the obtained resin composition may be deteriorated in moldability.

The resin composition is produced by previously intimately mixing the raw resin material with the composite particles, and then kneading the resultant mixture using a kneader or an extruder under heating while applying a strong shear force thereto in order to deaggregate the agglomerated composite particles and uniformly disperse the composite particles in the resin. Then, the obtained resin composition is molded into an aimed shape upon use.

The resin composition containing the composite particles produced by using as core particles the white inorganic particles (2) having a refractive index of less than 2.0 or the white inorganic particles (3) having a refractive index of not less than 2.0, may also be produced via master batch pellets.

The master batch pellets used in the present invention are produced (i) by mixing a binder resin as a base material for the paint or the resin composition with the composite particles, if necessary, using a mixing device such as ribbon blender, Nauter mixer, Henschel mixer and Super mixer, kneading and molding the resultant mixture using a known single-screw kneading extruder or twin-screw kneading extruder, and then cutting the molded product into pellets; or (ii) by mixing a binder resin as a base material for the paint or the resin composition with the composite particles, if necessary, using a mixing device such as ribbon blender, Nauter mixer, Henschel mixer and Super mixer, kneading the above mixture using Banbury mixer, press kneader or the like, and then pulverizing, molding or cutting the kneaded material into pellets.

The binder resin and the composite particles may be respectively supplied in separate batches into the kneader at predetermined constant ratios, or may be simultaneously supplied thereto in the form of a mixture of both the components.

The master batch pellets used in the present invention have an average major diameter of usually 1 to 6 mm, preferably 2 to 5 mm, and an average minor diameter of usually 2 to 5 mm, preferably 2.5 to 4 mm. When the average major diameter of the master batch pellets is less than 1 mm, the workability upon production of the pellets may be deteriorated. When the average major diameter of the master batch pellets is more than 6 mm, the master batch pellets are considerably different in size from that of diluting binder resin particles, so that it may be difficult to sufficiently disperse the pellets in the diluting binder resin. The master batch pellets may have any suitable shape such as an amorphous shape, a granular shape such as spherical shape, a cylindrical shape, a flake-like shape or the like.

As the binder resin for the master batch pellets of the present invention, there may be used resins of the same type as the above binder resin for the paint or the resin composition.

Meanwhile, the composition of the binder resin contained in the master batch pellets is preferably the same as that of the diluting binder resin. Also, the binder resin may be different from the diluting binder resin. In such a case, it is required that kinds of resins used are determined in view of various properties thereof so as to attain a good compatibility therebetween.

The amount of the composite particles blended in the master batch pellets is usually 1 to 200 parts by weight, preferably 1 to 150 parts by weight, more preferably 1 to 100 parts by weight based on 100 parts by weight of the binder resin. When the amount of the composite particles blended is less than 1 part by weight, the obtained master batch pellets may be insufficient in melt viscosity upon kneading, so that it may become difficult to sufficiently mix and disperse the composite particles in the resin. When the amount of the composite particles blended is more than 200 parts by weight, the amount of the binder resin may become comparatively small, so that it may also become difficult to sufficiently mix and disperse the composite particles in the resin. In addition, since even a slight change in amount of the master batch pellets added causes a considerable change in content of the composite particles in the resin composition, it may be difficult to control the content of the composite particles in the resin composition to the aimed level. Further, mechanical abrasion of products produced from such master batch pellets becomes remarkable.

Next, the process for producing the composite particles according to the present invention is described.

The composite particles of the present invention can be produced by first mixing the white inorganic particles with the gluing agent to coat the surface of the white inorganic particle with the gluing agent, and then mixing the thus-obtained gluing agent-coated white inorganic particles with the black pigment.

The formation of the gluing agent-coating layer on the surface of the white inorganic particle may be conducted by mechanically mixing and stirring the particles with a gluing agent solution or the gluing agent, or by mechanically mixing and stirring the white inorganic particles while spraying the gluing agent solution or the gluing agent thereonto. Substantially whole amount of the gluing agent added is coated on the surface of the white inorganic particle.

Meanwhile, in the case where alkoxysilanes or fluoroalkylsilanes are used as the gluing agent, a part of the alkoxysilanes or fluoroalkylsilanes may be coated in the form of organosilane compounds produced from the alkoxysilanes or fluoroalkyl organosilane compounds produced from fluoroalkylsilanes through the coating step. Even in such a case, subsequent coat of the black pigment on the gluing agent-coating layer is not adversely affected.

In order to uniformly coat the gluing agent over the surface of the white inorganic particle, it is preferred that the agglomerated white inorganic particles are previously deaggregated using a crusher.

The mixing and stirring of the white inorganic particles with the gluing agent and the mixing and stirring of the black pigment with the gluing agent-coated white inorganic particles, is preferably carried out using an apparatus capable of applying a shear force to the powder mixture, especially such an apparatus capable of simultaneously effecting shear action, spatula stroking and compression. Examples of such apparatuses may include wheel-type kneaders, ball-type kneaders, blade-type kneaders, roll-type kneaders or the like. Among these apparatuses, the wheel-type kneaders are preferred to effectively practice the present invention.

Specific examples of the wheel-type kneaders may include edge runners (similar in meaning to mix muller, Simpson mill and sand mill), multimill, Stotz mill, Wet pan mill, corner mill, ring muller or the like. Among these kneaders, preferred are edge runners, multimill, Stotz mill, Wet pan mill and ring muller, and more preferred are edge runners. Specific examples of the ball-type kneaders may include vibration mill or the like. Specific examples of the blade-type kneaders may include Henschel mixer, planetary mixer, Nauter mixer or the like. Specific examples of the roll-type kneaders may include extruders or the like.

The conditions of the mixing and stirring treatment may be selected so as to uniformly coat the surface of the white inorganic particle with the gluing agent. Specifically, the mixing and stirring conditions may be appropriately controlled such that the linear load is usually 19.6 to 1,960 N/cm (2 to 200 Kg/cm), preferably 98 to 1,470 N/cm (10 to 150 Kg/cm), more preferably 147 to 980 N/cm (15 to 100 Kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

The amount of the gluing agent added is usually 0.15 to 45 parts by weight based on 100 parts by weight of the white inorganic particles. When the gluing agent is added in an amount of 0.15 to 45 parts by weight, it is possible to coat a sufficient amount of black pigments onto the white inorganic particles. Therefore, it is unnecessary and meaningless to add black pigments in an amount of more than 45 parts by weight.

After the surface of the white inorganic particle is coated with the gluing agent, the black pigment is added, and then mixed and stirred with the gluing agent-coated white inorganic particles to coat the black pigment onto the gluing agent-coating layer. The obtained particles may be further subjected to drying or heating treatments, if required.

It is preferred that the black pigments are gradually added little by little for a period of preferably about 5 minutes to about 24 hours, more preferably about 5 minutes to about 20 hours, or are intermittently added in parts until the total amount thereof reaches 5 to 25 parts by weight based on 100 parts by weight of the white inorganic particles.

The mixing and stirring conditions may be appropriately selected so as to form a uniform black pigment coat on the gluing agent-coating layer, and may be controlled such that the linear load is usually 19.6 to 1,960 N/cm (2 to 200 Kg/cm), preferably 98 to 1,470 N/cm (10 to 150 Kg/cm), more preferably 147 to 980 N/cm (15 to 100 Kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

As the carbon black particles which are used for producing the black composite particles for the tread rubber composition, using the silica particles (1) as core particles, there may be exemplified commercially available furnace black and channel black, or the like. Specific examples of the carbon black particles may include #3050, #3150, #3250, #3750, #3950, MA100, MA7, #1000, #2400B, #30, MA77, MA8, #650, MA11, #50, #52, #45, #2200B and MA600 (tradenames; produced by Mitsubishi Kagaku Co., Ltd.), SEAST 9H, SEAST 7H, SEAST 6, SEAST 3H, SEAST 300 and SEAST FM (tradenames; produced by Tokai Carbon Co., Ltd.), RAVEN 1250, RAVEN 860, RAVEN 1000 and RAVEN 1190ULTRA (tradenames; produced by Colombian Chemicals Co.), KETCHEN BLACK EC and KETCHEN BLACK EC600JD (tradenames; produced by Ketchen Black International Co., Ltd.), BLACK PEARLS-L, BLACK PEARLS 1000, BLACK PERLS 4630, VULCAN XC72, REGAL 660 and REGAL 400 (tradenames; produced by Cabot Specialty Chemicals Inc.), or the like.

The average particle diameter of the carbon black particles which are used for producing the black composite particles for the tread rubber composition, using the silica particles (1) as core particles, is preferably about 0.005 to 0.05 $\mu$m, more preferably about 0.010 to 0.035 $\mu$m. When the average particle diameter thereof is less than 0.005 $\mu$m, the carbon black particles may be difficult to handle because of too fine particles. When the average particle diameter thereof is more than 0.05 $\mu$m, a very large mechanical shear force may be required to uniformly coat the carbon black particles onto the coating layer composed of alkoxysilanes, organosilane compounds or polysiloxanes because of too large particle size thereof, resulting in industrially disadvantageous process.

The carbon black in case of using the silica particles (1) as core particles, are added in an amount of usually 1 to 500 parts by weight, preferably 3 to 500 parts by weight, more preferably 50 to 500 parts by weight based on 100 parts by weight of the silica particles (1).

When the amount of carbon black added is less than 1 part by weight, it may be difficult to obtain composite particles having a sufficiently low volume resistivity value and a sufficient blackness because of too small amount of carbon black coated.

When the amount of carbon black added is more than 500 parts by weight, although it is possible to obtain a black composite particles having sufficient blackness and volume resistivity value, the carbon black may tend to be desorbed from the silica particles because of too large amount of the carbon black coated. As a result, the obtained composite particles may tend to be deteriorated in dispersibility in the tread rubber composition.

In case of using as core particles the white inorganic particles (2) having a refractive index of less than 2.0 or the white inorganic particles (3) having a refractive index of not less than 2.0, the black pigments such as carbon black and aniline black are added in an amount of usually 1 to 500 parts by weight, preferably 2 to 400 parts by weight, more preferably 5 to 300 parts by weight based on 100 parts by weight of the white inorganic particles. When the amount of the black pigments added is out of the above-specified range, it may be difficult to obtain the aimed composite particles.

The heating temperature used in the drying and heating treatments is usually 40 to 150° C., preferably 60 to 120° C. The heating time is usually 10 minutes to 12 hours, preferably 30 minutes to 3 hours.

Meanwhile, in the case where alkoxysilanes or fluoroalkylsilanes are used as the gluing agent, the gluing agent-coating layer finally produced via these steps is composed of organosilane compounds obtainable from the alkoxysilanes or fluorine-containing organosilane compounds obtainable from the fluoroalkylsilanes.

The black composite particles produced by using the silica particles (1) as core particles which are coated with a fatty acid, a metal salt of fatty acid or a silane-based coupling agent, can be produced by coating the above-produced black composite particles with the fatty acid, the metal salt of fatty acid or the silane-based coupling agent.

The coating of the black composite particles with the fatty acid, the metal salt of fatty acid or the silane-based coupling agent may be conducted by mechanically mixing and stirring the black composite particles with the fatty acid, metal salt of fatty acid or silane-based coupling agent while heating.

The fatty acid, the metal salt of fatty acid or the silane-based coupling agent may be added in an amount of preferably 0.13 to 67 parts by weight based on 100 parts by weight of the black composite particles. When the amount of the fatty acid, the metal salt of fatty acid or the silane-based coupling agent added is in the range of 0.13 to 67 parts by weight, the black composite particles can be more improved in dispersibility in the tread rubber composition.

The heating temperature used for coating the black composite particles with the fatty acid, the metal salt of fatty acid or the silane-based coupling agent, is preferably not less than 40° C., more preferably not less than 50° C., most preferably not less than 60° C. The upper limit of the heating temperature is a melting point or boiling point of the fatty acid, the metal salt of fatty acid or the silane-based coupling agent coated.

The white inorganic particles may be preliminarily coated, if required, with a coat comprising at least one compound selected from the group consisting of hydroxides of aluminum, oxides of aluminum, hydroxides of silicon and oxides of silicon, prior to mixing and stirring with the gluing agent.

The formation of the hydroxides and/or oxides of aluminum and/or silicon coat may be conducted by adding an aluminum compound, a silicon compound or both the aluminum and silicon compounds to a water suspension containing the white inorganic particles; mixing and stirring the resultant suspension, if required, followed by adequately adjusting the pH value thereof, thereby coating the white inorganic particles with an hydroxides and/or oxides of aluminum and/or silicon coat comprising at least one compound selected from the group consisting of hydroxides of aluminum, oxides of aluminum, hydroxides of silicon and oxides of silicon; and then subjecting the thus obtained particles to filtering-out, water-washing, drying and pulverization. Further, if required, the resultant particles may be subjected to deaeration, compaction or the like.

Examples of the aluminum compound may include aluminum salts such as aluminum acetate, aluminum sulfate, aluminum chloride and aluminum nitrate, alkali aluminates such as sodium aluminate, or the like.

Examples of the silicon compound may include water glass #3, sodium orthosilicate, sodium metasilicate or the like.

The point of the present invention is that the composite particles produced by coating black pigments onto the surface of the white inorganic particle through the gluing agent-coating layer, can exhibit an excellent dispersibility and an excellent light resistance.

The point of the present invention is that the black composite particles produced by coating carbon black onto the surface of silica particles (1) through the coating layer comprising organosilane compounds or polysiloxanes, can exhibit not only a high blackness and a less discoloration upon exposure to light (an excellent light resistance), but also a low volume resistivity value and an excellent dispersibility.

The reason why the black composite particles produced by using the silica particles (1) as core particles according to the present invention can exhibit a high blackness, is considered by the present inventors as follows. That is, since the silica particles used as the core particles are extender pigments having a low tinting strength and a low hiding power, and since the fine carbon black particles usually behaving as agglomerates due to fine particles can be uniformly and densely coated onto the surface of the silica particle through the coating layer comprising organosilane compounds obtainable from alkoxysilanes, or polysiloxanes, the carbon black coated can exhibit its own blackness without being eliminated by the hue of the core particles.

The reason why the black composite particles produced by using the silica particles (1) as core particles according to the present invention can exhibit a less discoloration upon exposure to light, is considered by the present inventors as follows. That is, it is considered that the discoloration of the composite particles can be prevented by coating the silica particles with the organosilane compounds or polysiloxanes having an excellent light resistance, and further by suppressing the surface activity of the silica particles by formation of such a coating layer.

The reason why the black composite particles produced by using the silica particles (1) as core particles according to the present invention can exhibit an excellent dispersibility in the tread rubber composition, is considered by the present inventors as follows. That is, since the silica particles themselves tend to show a poor compatibility with rubbers ordinarily used for tires owing to existence of hydrophilic silanol groups on the surface thereof and tend to be agglomerated together by formation of hydrogen bonds between the silanol groups, it has been conventionally difficult to uniformly disperse the silica particles in the rubber composition for tires or the like. Whereas, in the present invention, since carbon black capable of exhibiting an excellent dispersibility in the rubber composition for tires or the like is coated on the surface of the silica particles through the coating layer comprising organosilane compounds or polysiloxanes, the obtained black composite particles can be enhanced in compatibility with the rubber component used in the tread rubber composition. Further, since the amount of carbon black desorbed from the surface of the composite particles is considerably reduced, the black composite particles can be well dispersed in the reaction system without disturbance by the desorbed carbon black.

The reason why the tread rubber composition of the present invention can exhibit an excellent light resistance, is considered by the present inventors to be that the black composite particles used as a filler for the tread rubber are excellent in light resistance.

The reason why the tread rubber composition of the present invention can exhibit a low electric resistance, is considered by the present inventors to be that the black composite particles used as a filler for the tread rubber have a high conductivity.

The reason why the tread rubber composition of the present invention can exhibit excellent wear resistance and tensile strength, is considered by the present inventors to be that the black composite particles of the present invention can be uniformly dispersed in the tread rubber composition.

Another point of the present invention is that the black composite particles comprising white inorganic particles (2) having a refractive index of less than 2.0, a gluing agent-coating layer formed on the surface of the white inorganic particles (2), and a black pigment coat coated onto the gluing agent-coating layer and composed of aniline black or carbon black, are capable of not only imparting thereto various functions such as electric properties according to applications thereof, but also exhibiting excellent light resistance, tinting strength, blackness and dispersibility in vehicle.

An other point of the present invention is that the composite particles comprising white inorganic particles (3) having a refractive index of not less than 2.0, a gluing agent-coating layer formed on the surface of the white inorganic particles (3), and a black pigment coat coated onto the gluing agent-coating layer and composed of aniline black or carbon black, are capable of not only imparting thereto various functions such as electric properties according to applications thereof, but also exhibiting excellent ultraviolet light-shielding property, light resistance, tinting strength and dispersibility in vehicle.

The reason why the black composite particles using the white inorganic particles (2) having a refractive index of less than 2.0 as core particles can exhibit an excellent light resistance, is considered by the present inventors to be that the black pigments having a remarkably excellent light resistance as compared to dyes are adhered onto the surface of the core particles having a relatively excellent light resistance through the coating layer composed of the gluing agent having an excellent light resistance.

The reason why the composite particles produced by using the white inorganic particles (3) having a refractive index of not less than 2.0 as core particles, can exhibit an excellent light resistance, is considered by the present inventors to be that the composite particles themselves are excellent in ultraviolet light-shielding property, and the black pigments having a remarkably excellent light resistance as compared to dyes are coated onto the core particles having an excellent light resistance through the gluing agent having an excellent light resistance.

The reason why the composite particles produced by using the white inorganic particles (2) having a refractive index of less than 2.0 or the white inorganic particles (3) having a refractive index of not less than 2.0 as core particles, can exhibit an excellent dispersibility, is considered by the present inventors as follows. That is, since the black pigments coated are prevented from being desorbed from the surface of the core particles, the composite particles of the present invention can be well dispersed in vehicle without disturbance by the desorbed black pigments.

The reason why the composite particles produced by using the white inorganic particles (3) having a refractive index of not less than 2.0 can exhibit an excellent ultraviolet light-shielding property, is considered by the present inventors as follows. That is, the white inorganic particles (3) having a refractive index of not less than 2.0, in particular, titanium oxide and zinc oxide, can exhibit a good absorptivity to wavelength of ultraviolet light region; the gluing agent, in particular, organosilicon compounds, can exhibit a low light transmittance to wavelength of ultraviolet light region as compared to that of distilled water; and the black pigments, in particular, carbon black, can exhibit a high absorptivity over a wide wavelength region from ultraviolet to infrared, so that the obtained composite particles can exhibit a higher ultraviolet light-shielding property owing to the synergistic effect obtained by the combination thereof.

The composite particles according to the present invention can exhibit an excellent light resistance and an excellent dispersibility, and therefore, are suitable as a filler for tread rubber composition, paint and resin composition.

More specifically, the black composite particles produced by using the silica particles (1) as core particles according to the present invention can exhibit not only a less discoloration upon exposure to light, but also a low volume resistivity value and an excellent dispersibility and, therefore, are suitable as a filler or colorant for tread rubber composition.

In addition, the rubber composition prepared by blending the above black composite particles in rubber can exhibit not only a discoloration upon exposure to light, but also a low electric resistance and excellent wear resistance and tensile strength and, therefore, are suitable as tread rubber composition.

The black composite particles produced by using the white inorganic particles (2) having a refractive index of less than 2.0 according to the present invention, are capable of not only imparting thereto various functions such as electric properties according to applications thereof, but also exhibiting excellent light resistance, tinting strength and dispersibility in vehicle and, therefore, suitable as black composite particles. Thus, the black composite particles of the present invention can be suitably used as colorants, fillers or the like for black pigments, black paints and black resin compositions.

The composite particles produced by using the white inorganic particles (3) having a refractive index (3) of not less than 2.0 as core particles according to the present invention, are capable of imparting thereto various functions according to applications thereof, and exhibiting, in particular, an excellent ultraviolet light-shielding property, as well as excellent light resistance, handling property and dispersibility in vehicle.

EXAMPLES

The present invention is described in more detail by Examples and Comparative Examples, but the Examples are only illustrative and, therefore, not intended to limit the scope of the present invention.

Various properties were evaluated by the following methods.

(1) The average particle size of the particles was expressed by an average value of 350 particles observed on a micrograph.

(2) The specific surface area was expressed by the value measured by a BET method.

(3) The amounts of Al and Si which were present on the surface of white inorganic particle coated with an hydroxides and/or oxides of aluminum and/or silicon coating material, were respectively measured by a fluorescent X-ray spectroscopy device "3063 M-type" (manufactured by RIGAKU DENKI KOGYO CO., LTD.) according to JIS K0119 "General rule of fluorescent X-ray analysis".

(4) The amount of the gluing agent-coating layer formed onto the surface of the white inorganic particles and the amount of the black pigment coat formed onto the gluing agent-coating layer were respectively expressed by the amount of carbon measured by "Horiba Metal, Carbon and Sulfur Analyzer EMIA-2200 Model" (manufactured by HORIBA SEISAKUSHO CO., LTD.).

(5) The desorption percentage (%) of black pigment desorbed from the composite particles was measured by the following method. The closer to 0% the desorption percentage, the smaller the amount of the black pigment desorbed from the surface of the composite particles.

That is, 3 g of the composite particles and 40 ml of ethanol were placed in a 50-ml precipitation tube and then were subjected to ultrasonic dispersion for 20 minutes. Thereafter, the obtained dispersion was allowed to stand for 120 minutes, and black pigment desorbed was separated from the composite particles on the basis of the difference in specific gravity therebetween. Successively, the obtained composite particles were mixed again with 40 ml of ethanol, and then subjected to ultrasonic dispersion for 20 minutes.

The obtained dispersion was allowed to stand for 120 minutes, and black pigment desorbed was separated from the composite particles. The resultant composite particles were then dried at 100° C. for one hour, and the carbon content thereof was measured by "Horiba Metal, Carbon and Sulfur Analyzer EMIA-2200 Model" (manufactured by HORIBA SEISAKUSHO CO., LTD.). The desorption percentage (%) of black pigment was calculated from the thus measured values according to the following formula:

$$\text{Desorption percentage of black pigment } (\%) = \{(W_a - W_e)/W_a\} \times 100$$

wherein $W_a$ represents an amount of black pigment initially coated onto the composite particles; and We represents an amount of black pigment still coated onto the composite particles after desorption test.

(6) The hue of each of the white inorganic particles, black pigments and composite particles was measured by the following method.

That is, 0.5 g of each sample and 0.5 ml of castor oil were intimately kneaded together by a Hoover's muller to form a paste. 4.5 g of clear lacquer was added to the obtained paste and was intimately kneaded to form a paint. The obtained paint was applied on a cast-coated paper by using a 150 μm (6-mil) applicator to produce a coating film piece (having a film thickness of about 30 μm). The thus obtained coating film piece was measured by a Multi-Spectro-Colour-Meter (manufactured by SUGA SHIKENKI CO., LTD.) to determine color specification values (L*, a* and b* values) thereof according to JIS Z 8929. Meanwhile, the C* value representing chroma is calculated according to the following formula:

$$C^* = ((a^*)^2 + (b^*)^2)^{1/2}$$

(7) The tinting strength of the composite particles was measured by the following method.

That is, a primary color enamel and a vehicle enamel prepared by the below-mentioned method were respectively applied on a cast-coated paper by a 150 μm (6-mil) applicator to produce coating film pieces. The thus obtained coating film pieces were measured by a multi-spectro-colour-meter "MSC-IS-2D" (manufactured by SUGA TESTING MACHINES MANUFACTURING CO., LTD.) to determine L* values thereof. The difference between the obtained L* values was represented by a ΔL* value.

Next, as a standard sample for the composite particles, a mixed composite particles was prepared by simply mixing the black pigment and the white inorganic particles at the same mixing ratio as used for the production of the composite particles produced by using the thus prepared mixed composite particles as standard sample, the same procedure as defined above was conducted to prepare an primary color enamel and a vehicle enamel, form coating film pieces and measure L* values thereof. The difference between the L* values was represented by a ΔLs* value.

From the obtained ΔL* value of the composite particles and ΔLs* value of the standard sample, the tinting strength (%) was calculated according to the following formula:

$$\text{Tinting strength } (\%) = 100 + \{(\Delta Ls^* - \Delta L^*) \times 10\}$$

Preparation of Primary Color Enamel:

10 g of the above sample particles, 16 g of an amino alkyd resin and 6 g of a thinner were blended together. The resultant mixture was added together with 90 g of 3 mmφ glass beads into a 140-ml glass bottle, and then mixed and dispersed for 45 minutes by a paint shaker. The obtained mixture was mixed with 50 g of an amino alkyd resin, and further dispersed for 5 minutes by a paint shaker, thereby obtaining an primary color enamel.

Preparation of Vehicle Enamel:

12 g of the above-prepared primary color enamel and 40 g of Aramic White (titanium dioxide-dispersed amino alkyd resin) were blended together, and the resultant mixture was mixed and dispersed for 15 minutes by a paint shaker, thereby preparing a vehicle enamel.

(8) The light resistances of the white inorganic particles, black pigment and composite particles were measured by the following method.

That is, the same primary color enamel as prepared above for the measurement of tinting strength, was applied onto a cold-rolled steel plate (0.8 mm×70 mm×150 mm; JIS G-3141) and dried to form a coating film having a thickness of 150 µm. One half of the thus prepared test specimen was covered with a metal foil, and an ultraviolet light was continuously irradiated over the test specimen at an intensity of 100 mW/cm$^2$ for 6 hours using "EYE SUPER UV TESTER SUV-W13" (manufactured by IWASAKI DENKI CO., LTD.). Then, the hues (L*, a* and b* values) of the metal foil-covered non-irradiated portion and the UV-irradiated portion of the test specimen were respectively measured. The ΔE* value was calculated from differences between the measured hue values of the metal foil-covered non-irradiated portion and the UV-irradiated portion according to the following formula:

$$\Delta E^* = [(\Delta L^*)^2 + (\Delta a^*)^2 + (\Delta b^*)^2]^{1/2}$$

wherein ΔL* represents the difference between L* values of the non-irradiated and UV-irradiated portions; Δa* represents the difference between a* values of the non-irradiated and UV-irradiated portions; and Δb* represents the difference between b* values of the non-irradiated and UV-irradiated portions.

(9) The repose angle (°) of the composite particles was measured using "powder tester" (manufactured by Hosokawa Micron Co., Ltd.). The smaller the repose angle, the more excellent the fluidity of the composite particles.

(10) The ultraviolet light-shielding property of the composite particles was expressed by the light transmittance (%) at 360 nm of a coating film obtained by applying a coating composition prepared by the following method onto a 100 µm-thick clear base film. The light transmittance was measured by using a self-recording photoelectric spectrophotometer "UV-2100" (manufactured by SHIMADZU SEISAKUSHO CO., LTD.).

Preparation of Paint for Evaluation of Ultraviolet Light-Shielding Property:

Sample particles, resins and solvents were charged at the following weight ratio into a 250-ml glass bottle, and then mixed and dispersed therein together with 160 g of 3 mmφ glass beads, for 120 minutes by a paint shaker, thereby preparing a paint for evaluation of ultraviolet light-shielding property.

Composition of Paint for Evaluation of Ultraviolet Light-Shielding Property:

| | |
|---|---|
| Sample particles | 4.0 parts by weight |
| Melamine resin (SUPER PECKAMINE J-820-60 (tradename) produced by DAI-NIPPON INK KAGAKU KOGYO CO., LTD.) | 15.7 parts by weight |

-continued

| | |
|---|---|
| Alkyd resin (BECKOZOL 1307-60EL (tradename) produced by DAI-NIPPON INK KAGAKU KOGYO CO., LTD.) | 31.5 parts by weight |
| Xylene | 29.7 parts by weight |
| Butanol | 1.6 parts by weight |

(11) The surface activity of the composite particles was evaluated by measuring an amount of residual solvent by the following method.

First, 1 g of sample particles and 10 g of a solvent (MEK) were weighed. Then, the sample particles were immersed in the solvent for 3 hours, and then air-dried for 24 hours. After further drying the sample particles at 60° C. for 24 hours, the carbon content in the dried particles was measured by "Horiba Metal, Carbon and Sulfur Analyzer EMIA-2200 Model" (manufactured by HORIBA SEISAKUSHO CO., LTD.) to determine the amount of residual carbon contained in the sample particles. The smaller the amount of residual carbon, the smaller the amount of residual solvent and the more effectively the surface activity of the particles can be suppressed.

(12) The volume resistivity value of each of the silica particles, black pigment, composite particles and tread rubber composition was determined by measuring the electric resistance value of the respective samples prepared by the following method.

In the case of each of the silica particles and composite particles, 0.5 g of sample particles thereof were weighed, and pressure-molded under a pressure of 1.372×10$^7$ Pa (140 Kg/cm$^2$) by a KBr tableting machine (manufactured by SHIMADZU SEISAKUSHO CO., LTD.), thereby preparing a cylindrical test specimen. In the case of the tread rubber composition, a resin plate prepared by the below-mentioned method was punched into a cylindrical test specimen.

Next, the thus prepared test specimen was exposed to the environmental condition at a temperature of 25° C. and a relative humidity of 60% for not less than 12 hours, and then set between a pair of stainless steel electrodes. The test specimen was applied with a voltage of 15 V by using a Wheastone bridge ("TYPE 2768" manufactured by Yokogawa Hokushin Denki Co., Ltd.) to measure an electric resistance value R (Ω) thereof.

Then, a top surface area A (cm$^2$) and a thickness $t_0$ (cm) of the cylindrical test specimen were measured, and the volume resistivity value (Ω·cm) thereof was calculated by inserting the measured values into the following formula:

Volume Resistivity Value $(\Omega \cdot cm) = R \times (A/t_0)$ (13-1) The light resistance of the tread rubber composition was measured by the following method.

That is, one half of a resin plate prepared by the below-mentioned method was covered with a metal foil, and an ultraviolet light was continuously irradiated over the resin plate at an intensity of 100 mW/cm$^2$ for 2 hours by using "EYE SUPER UV TESTER SUV-W13" (manufactured by IWASAKI DENKI CO., LTD.). Then, the hues (L*, a* and b* values) of the UV-irradiated portion and the metal foil-covered non-irradiated portion of the resin plate were respectively measured. The ΔE* value was calculated from differences between the measured hue values of the metal foil-covered non-irradiated portion and the UV-irradiated portion according to the following formula:

$$\Delta E^* = [(\Delta L^*)^2 + (\Delta a^*)^2 + (\Delta b^*)^2]^{1/2}$$

wherein ΔL* represents the difference between L* values of the non-irradiated and UV-irradiated portions; Δa* represents the difference between a* values of the non-irradiated and UV-irradiated portions; and Δb* represents the difference between b* values of the non-irradiated and UV-irradiated portions.

(13-2) The light resistances of the respective resin compositions were measured by the following method.

That is, one half of the resin plate as prepared and used for measuring the hues of the above tread rubber composition, was covered with a metal foil, and an ultraviolet light was continuously irradiated over the resin plate at an intensity of 100 mW/cm² for 6 hours by using "EYE SUPER UV TESTER SUV-W13" (manufactured by IWASAKI DENKI CO., LTD.). Then, the hues (L*, a* and b* values) of the metal foil-covered non-irradiated portion and the UV-irradiated portion of the resin plate were respectively measured. The ΔE* value was calculated from differences between the measured hue values of the metal foil-covered non-irradiated portion and the UV-irradiated portion according to the following formula:

$$\Delta E^* = [(\Delta L^*)^2 + (\Delta a^*)^2 + (\Delta b^*)^2]^{1/2}$$

wherein ΔL* represents the difference between L* values of the non-irradiated and UV-irradiated portions; Δa* represents the difference between a* values of the non-irradiated and UV-irradiated portions; and Δb* represents the difference between b* values of the non-irradiated and UV-irradiated portions.

(14-1) The dispersibility of the composite particles in the tread rubber composition was evaluated by visually counting the number of undispersed aggregate particles on the surface of the obtained tread rubber composition, and classifying the results into the following five ranks. The Rank 5 represents the most excellent dispersing condition.

Rank 5: No undispersed aggregate particles were recognized.

Rank 4: 1 to 4 undispersed aggregate particles per 1 cm² were recognized;

Rank 3: 5 to 9 undispersed aggregate particles per 1 cm² were recognized;

Rank 2: 10 to 49 undispersed aggregate particles per 1 cm² were recognized;

Rank 1: Not less than 50 undispersed aggregate particles per 1 cm² were recognized.

(14-2) The dispersibility of the composite particles in the resin composition was evaluated by visually counting the number of undispersed aggregate particles on the surface of the obtained colored resin plate, and classifying the results into the following five ranks. The Rank 5 represents the most excellent dispersing condition.

Rank 5: No undispersed aggregate particles were recognized.

Rank 4: 1 to 4 undispersed aggregate particles per 1 cm² were recognized;

Rank 3: 5 to 9 undispersed aggregate particles per 1 cm² were recognized;

Rank 2: 10 to 49 undispersed aggregate particles per 1 cm² were recognized;

Rank 1: Not less than 50 undispersed aggregate particles per 1 cm² were recognized.

(15) The wear resistance of the tread rubber composition was determined as follows. That is, the abrasion loss of the tread rubber composition was measured by using "Lanborn abrasion tester" under a load of 39.2 N (4.5 Kg) at a slip rate of 50% according to JIS K 6264. The wear resistance was expressed by an index of the measured abrasion loss which was obtained as a relative value assuming that the abrasion loss of the tread rubber composition obtained in Comparative Example 1 was 100. The larger the index of the abrasion loss, the more excellent the wear resistance.

(16) The tensile strength of the tread rubber composition was measured according to JIS K 6301.

(17) The hues of the solvent-based paint and water-based paint using the composite particles were measured by the following method.

That is, the respective paints prepared by the below-mentioned methods, were applied onto a cold-rolled steel plate (0.8 mm×70 mm×150 mm; JIS G-3141) and dried to form a coating film having a thickness of 150 μm. The thus obtained test specimens were measured by a Multi-Spectro-Colour-Meter (manufactured by SUGA SHIKENKI CO., LTD.) to determine color specification values (L*, a* and b* values) thereof according to JIS Z 8929. Also, the hue of the resin composition tinted with the composite particles was determined as follows. That is, the hue of a colored resin plate prepared by the below-mentioned method was measured by using a Multi-Spectro-Colour-Meter (manufactured by SUGA SHIKENKI CO., LTD.) by the same method as described above.

(18) The gloss of the coating film was measured by irradiating light at an incident angle of 60°, using "gloss meter UGV-5D" (manufactured by SUGA TESTING MACHINES MANUFACTURING CO., LTD.). The higher the gloss, the more excellent the dispersibility of the composite particles in the paint.

(19) The light resistances of coating films produced from the respective paints, were measured by the following method.

That is, one half of the same test specimen as prepared and used for measuring hues of the above paints, was covered with a metal foil, and an ultraviolet light was continuously irradiated over the test specimen at an intensity of 100 mW/cm² for 6 hours using "EYE SUPER UV TESTER SUV-W13" (manufactured by IWASAKI DENKI CO., LTD.). Then, the hues (L*, a* and b* values) of the metal foil-covered non-irradiated portion and the UV-irradiated portion of the test specimen were respectively measured. The ΔE* value was calculated from differences between the measured hue values of the metal foil-covered non-irradiated portion and the UV-irradiated portion according to the above-described formula.

$$\Delta E^* = [(\Delta L^*)^2 + (\Delta a^*)^2 + (\Delta b^*)^2]^{1/2}$$

wherein ΔL* represents the difference between L* values of the non-irradiated and UV-irradiated portions; Δa* represents the difference between a* values of the non-irradiated and UV-irradiated portions; and Δb* represents the difference between b* values of the non-irradiated and UV-irradiated portions.

(20) The storage stability of the paint was measured by the following method.

That is, the respective paints prepared by the below-mentioned method were applied onto a cold-rolled steel plate (0.8 mm×70 mm×150 mm; JIS G-3141) and dried to form a coating film having a thickness of 150 μm. Then, the L*, a* and b* values of the thus prepared coating film were measured. Separately, the respective paints were allowed to stand at 25° C. for one week, and then applied onto the cold-rolled steel plate and dried to form a similar coating film. The L*, a* and b* values of the thus prepared coating film were also measured. The ΔE* value was calculated from the differences between the measured values according to the following formula:

$$\Delta E^* = [(\Delta L^*)^2 + (\Delta a^*)^2 + (\Delta b^*)^2]^{1/2}$$

wherein $\Delta L^*$ represents the difference between $L^*$ values before and after the standing test; $\Delta a^*$ represents the difference between $a^*$ values before and after the standing test; and $\Delta b^*$ represents the difference between $b^*$ values before and after the standing test.

(21) The viscosity at 25° C. of the paint prepared by the below-mentioned method, was measured at a shear rate of 1.92 sec$^{-1}$ by using an E-type viscometer (cone plate-type viscometer) "EMD-R" (manufactured by TOKYO KEIKI CO., LTD.).

(22) The anti-aging property was determined as follows. That is, a colored resin plate (1.5 cm in length×1.5 cm in width×1 mm in thickness) in which the composite particles were kneaded, was heated at 190° C. to measure an area S of a discolored portion due to deteriorated resin. The ratio $S/S_0$ of the measured area S to a surface area $S_0$ of the colored resin plate before heating (1.5×1.5=2.25 cm$^2$) was measured at intervals of 5%. Specifically, the condition of "$(S/S_0) \times 100$"=0% indicates no deterioration of resin, while the condition of "$(S/S_0) \times 100$"=100% indicates complete deterioration of resin.

Example 1
<Production of Black Composite Particles>

330 g of methyl hydrogen polysiloxane (tradename: "TSF484", produced by GE TOSHIBA SILICONE CO., LTD.) was added to 11.0 kg of silica particles (particle shape: granular shape; average particle diameter: 0.022 µm; BET specific surface area value: 193.8 m$^2$/g; volume resistivity value: 3.6×10$^7$ Ω·cm) while operating an edge runner, and the resultant mixture was mixed and stirred for 40 minutes under a linear load of 588 N/cm (60 Kg/cm) at a stirring speed of 22 rpm.

Then, 11.0 kg of fine carbon black particles (particle shape: granular shape; particle diameter: 0.022 µm; BET specific surface area value: 134 m$^2$/g; blackness ($L^*$ value) of 16.6) were added to the mixture for 10 minutes while operating the edge runner, and the resultant mixture was mixed and stirred for 80 minutes under a linear load of 588 N/cm (60 Kg/cm) at a stirring speed of 22 rpm, thereby coating carbon black onto the methyl hydrogen polysiloxane coating layer formed on the respective silica particles. The obtained particles were dried at 105° C. for 60 minutes using a dryer, thereby obtaining black composite particles.

The thus obtained black composite particles were in the form of granular particles having an average particle diameter of 0.026 µm, and had a BET specific surface area value of 124.2 m$^2$/g; a volume resistivity value of 7.4×10 Ω·cm; a light resistance ($\Delta E^*$ value) of 2.4; a blackness ($L^*$ value) of 17.0; a carbon black desorption percentage of 7.8%; and a coating amount of methyl hydrogen polysiloxane of 1.30% by weight (calculated as Si). In addition, it was confirmed that the amount of carbon black coated was 48.62% by weight (calculated as C; corresponding to 100 parts by weight based on 100 parts by weight of the silica particles). As a result of observing the micrograph, since almost no carbon black was recognized from the micrograph, it was confirmed that a substantially whole amount of the carbon black used contributed to the formation of the carbon black coat on the coating layer composed of methyl hydrogen polysiloxane.

Example 2
<Production of Tread Rubber Composition>

The following components were mixed and kneaded together at the weight ratio shown below by an ordinary method using a Banbury mixer and a kneading roller, thereby preparing a tread rubber composition.

Tread Rubber Composition:

| | |
|---|---|
| Styrene-butadiene copolymer | 100.0 parts by weight |
| Black composite particles | 40.0 parts by weight |
| Zinc oxide | 3.0 parts by weight |
| Stearic acid | 2.0 parts by weight |
| Anti-aging agent | 2.0 parts by weight |
| Wax | 1.0 part by weight |
| Sulfur | 1.8 parts by weight |
| Vulcanization-accelerator | 0.8 part by weight |

The thus obtained tread rubber composition was press-vulcanized at 160° C. for 20 minutes, thereby preparing a test specimen. The obtained test specimen was subjected to various tests.

As a result, it was confirmed that the obtained tread rubber composition had a wear resistance of 110; an electric resistance value of 3.2×10$^3$ Ω·cm; a tensile strength of 24.8 MPa; and a light resistance ($\Delta E^*$ value) of 0.38. Further, it was confirmed that the dispersing condition of the composite particles in the tread rubber composition was Rank 5.

Example 3
<Production of Black Composite Particles>

350 g of methyl hydrogen polysiloxane (tradename: "TSF484", produced by GE TOSHIBA SILICONE CO., LTD.) was added to 7.0 kg of silica particles (particle shape: granular shape; average particle diameter: 0.511 µm; BET specific surface area value: 3.2 m$^2$/g; $L^*$ value: 93.8; $a^*$ value: 0.41; $b^*$ value: 0.76; $C^*$ value: 0.86; refractive index: 1.42; light resistance: 5.56) while operating an edge runner, and the resultant mixture was mixed and stirred for 30 minutes under a linear load of 588 N/cm (60 Kg/cm) at a stirring speed of 22 rpm.

Then, 3.5 kg of black pigments C-2 (kind: aniline black; particle shape: rod shape; average particle diameter: 0.31 µm; BET specific surface area value: 56.8 m$^2$/g; $L^*$ value: 16.20; $a^*$ value: −1.03; $b^*$ value: 0.46; volume resistivity value: 3.6×10$^{11}$ Ω·cm; light resistance ($\Delta E^*$ value): 15.21) were added to the mixture for 30 minutes while operating the edge runner, and the resultant mixture was mixed and stirred for 100 minutes under a linear load of 588 N/cm (60 Kg/cm) at a stirring speed of 22 rpm, thereby coating the black pigments C-2 onto the methyl hydrogen polysiloxane coating layer formed on the respective silica particles. The obtained particles were dried at 80° C. for 60 minutes using a dryer, thereby obtaining black composite particles.

The thus obtained black composite particles were in the form of granular particles having an average particle diameter of 0.513 µm, and had a BET specific surface area value of 12.9 m$^2$/g; a hue ($L^*$ value) of 17.57; a tinting strength of 137%; a repose angle of 35°; a volume resistivity value of 9.4×10$^{10}$ Ω·cm; a surface activity of 0.78%; a light resistance ($\Delta E^*$ value) of 2.14; a black pigment desorption percentage of 6.4%; and a coating amount of methyl hydrogen polysiloxane of 2.08% by weight (calculated as C). In addition, it was confirmed that the amount of the black pigments C-2 coated was 27.18% by weight (calculated as C; corresponding to 50 parts by weight based on 100 parts by weight of the silica particles).

As a result of observing the micrograph, since almost no black pigments C-2 were recognized from the micrograph, it was confirmed that a substantially whole amount of the black pigments C-2 used contributed to the formation of the black pigment coat on the coating layer composed of methyl hydrogen polysiloxane. Further, it was recognized that the black pigments C-2 coated no longer maintained the particle shape and particle size of initially added black pigments C-2, i.e., the black pigments C-2 were coated in the form of much finer particles than the core particles to form a black pigment coat on the surface of the respective core particles.

Example 4

<Production of Solvent-Based Paint Containing Black Composite Particles>

10 g of the black composite particles produced in Example 3, were blended with an amino alkyd resin and a thinner at the following weight ratio, and charged into a 140-ml glass bottle together with 90 g of 3 mm$\phi$ glass beads. Next, the obtained mixture was mixed and dispersed for 90 minutes by a paint shaker, thereby preparing a mill base.

Composition of Mill Base:

| | |
|---|---|
| Black composite particles | 12.2 parts by weight |
| Amino alkyd resin (AMILAC No. 1026, produced by KANSAI PAINT CO., LTD.) | 19.5 parts by weight |
| Thinner | 7.3 parts by weight |

The above-prepared mill base was blended with an amino alkyd resin at the following weight ratio, and the obtained mixture was further mixed and dispersed for 15 minutes by a paint shaker, thereby obtaining a solvent-based paint containing the black composite particles.

Composition of Paint:

| | |
|---|---|
| Mill base | 39.0 parts by weight |
| Amino alkyd resin (AMILAC No. 1026, produced by KANSAI PAINT CO., LTD.) | 61.0 parts by weight |

The thus obtained solvent-based paint exhibited a viscosity of 1,068 cP and a storage stability ($\Delta E^*$ value) of 0.91.

Next, the thus prepared solvent-based paint was applied onto a cold-rolled steel plate (0.8 mm×70 mm×150 mm; JIS G-3141) and dried to form a coating film having a thickness of 150 $\mu$m. The obtained coating film showed a gloss of 92%, a blackness ($L^*$ value) of 17.81 and a light resistance ($\Delta E^*$ value) of 2.44.

Example 5

<Production of Water-Based Paint Containing Composite Particles>

7.62 g of the black composite particles obtained in Example 3, were blended with a water-soluble alkyd resin and the like at the following weight ratio, and charged into a 140-ml glass bottle together with 90 g of 3 mm$\phi$ glass beads. Next, the obtained mixture was mixed and dispersed for 90 minutes by a paint shaker, thereby preparing a mill base.

Composition of Mill Base:

| | |
|---|---|
| Black composite particles | 12.4 parts by weight |
| Water-soluble alkyd resin (tradename: "S-118", produced by DAI-NIPPON INK KAGAKU KOGYO CO., LTD.) | 9.0 parts by weight |
| Defoamer (tradename: "NOPCO 8034", produced by SUN NOPCO CO., LTD.) | 0.1 part by weight |
| Water | 4.8 parts by weight |
| Butyl cellosolve | 4.1 parts by weight |

The above-prepared mill base was blended with paint components shown below at the following weight ratio, and the obtained mixture was further mixed and dispersed for 15 minutes by a paint shaker, thereby obtaining a water-based paint containing the black composite particles.

Composition of Paint:

| | |
|---|---|
| Mill base | 30.4 parts by weight |
| Water-soluble alkyd resin (tradename: S-118, produced by DAI -NIPPON INK KAGAKU KOGYO CO., LTD.) | 46.2 parts by weight |
| Water-soluble melamine resin (tradename: S-695, produced by DAI-NIPPON INK KAGAKU KOGYO CO., LTD.) | 12.6 parts by weight |
| Defoamer (tradename: "NOPCO 8034", produced by SUN NOPCO CO., LTD.) | 0.1 part by weight |
| Water | 9.1 parts by weight |
| Butyl cellosolve | 1.6 parts by weight |

The thus obtained water-based paint exhibited a viscosity of 2,708 cP and a storage stability ($\Delta E^*$ value) of 0.89.

Next, the thus prepared water-based paint was applied onto a cold-rolled steel plate (0.8 mm×70 mm×150 mm; JIS G-3141) and dried to form a coating film having a thickness of 150 $\mu$m. The obtained coating film showed a gloss of 90%, a blackness ($L^*$ value) of 17.92 and a light resistance ($\Delta E^*$ value) of 2.40.

Example 6

<Production of Resin Composition>

2.5 g of the black composite particles obtained in Example 3, and 47. 5 g of polyvinyl chloride resin particles 103EP8D (produced by NIPPON ZEON CO., LTD.) were weighed and charged into a 100-ml beaker made of resins, and intimately mixed together by a spatula, thereby obtaining mixed particles.

0.5 g of calcium stearate was added to the obtained mixed particles. The mixed particles were intimately mixed and then slowly supplied to hot rolls heated to 160° C. whose clearance was set to 0.2 mm, and continuously kneaded therebetween until a uniform resin composition was produced. The resin composition kneaded was separated from the hot rolls and used as a raw material for forming a colored resin plate.

Next, the thus-produced resin composition was interposed between a pair of surface-polished stainless steel plates, placed within a hot press heated to 180° C. and then subjected to a pressure molding while applying a pressure of 98 MPa (1 ton/cm$^2$) thereto, thereby obtaining a colored resin plate having a thickness of 1 mm. The thus-produced colored resin plate had a dispersing condition of Rank 5, a hue ($L^*$ value) of 17.89 and a light resistance ($\Delta E^*$ value) of 2.66.

The obtained colored resin plate was cut into test pieces of 1.5 cm square. Three test pieces were placed in a Geer oven heated to 190° C., and taken out therefrom one by one at 30 minute, 60 minute and 120 minute, respectively, after starting the examination to examine the deterioration of resin. As a result, it was confirmed that the degree of resin deterioration, i.e., the anti-aging property ($S/S_0\times100$) was 0% after 30 minutes, 5% after 60 minutes and 5% after 120 minutes.

Example 7

<Production of Composite Particles>

20 kg of titanium oxide particles (particle shape: granular shape; average particle diameter: 0.242 $\mu$m; BET specific surface area value: 11.6 m$^2$/g; L* value: 96.31, a* value: 1.06, b* value: −1.66 and C* value: 1.97; refractive index: 2.71; light resistance ($\Delta E^*$ value): 6.86) were deaggregated in 150 liters of pure water using a stirrer, and further passed through "TK pipeline homomixer" (manufactured by TOKUSHU KIKA KOGYO CO., LTD.) three times, thereby obtaining a slurry containing the titanium oxide particles.

Successively, the obtained slurry containing the titanium oxide particles was passed through a transverse-type sand grinder (tradename "MIGHTY MILL MHG-1.5L", manufactured by INOUE SEISAKUSHO CO., LTD.) five times at an axis-rotating speed of 2,000 rpm, thereby obtaining a slurry in which the titanium oxide particles were dispersed.

The titanium oxide particles in the obtained slurry which remained on a sieve of 325 meshes (mesh size: 44 $\mu$m) was 0%. The slurry was filtered and washed with water, thereby obtaining a wet cake composed of the titanium oxide particles. The obtained wet cake composed of the titanium oxide particles was dried at 120° C. Then, 7.0 kg of the dried particles were charged into an edge runner "MPUV-2 Model" (tradename, manufactured by MATSUMOTO CHUZO TEKKOSHO CO., LTD.), and mixed and stirred at 294 N/cm (30 Kg/cm) for 30 minutes, thereby lightly deaggregating the particles.

Next, 140 g of methyl hydrogen polysiloxane (tradename: "TSF484", produced by GE TOSHIBA SILICONE CO., LTD.) was added to the thus obtained titanium oxide particles while operating an edge runner, and the resultant mixture was mixed and stirred for 30 minutes under a linear load of 588 N/cm (60 Kg/cm) at a stirring speed of 22 rpm.

Then, 7.0 kg of black pigments C-1 (kind: carbon black; particle shape: granular shape; average particle diameter: 0.02 $\mu$m; BET specific surface area value: 134.0 m$^2$/g; L* value: 16.60; volume resistivity value: $2.0\times10^2$ $\Omega\cdot$cm; light resistance ($\Delta E^*$ value): 12.65) were added to the mixture for 100 minutes while operating the edge runner, and the resultant mixture was mixed and stirred for 60 minutes under a linear load of 588 N/cm (60 Kg/cm) at a stirring speed of 22 rpm, thereby coating the black pigments C-1 onto the methyl hydrogen polysiloxane coating layer formed on the respective titanium oxide particles. The obtained particles were dried at 105° C. for 60 minutes using a dryer, thereby obtaining composite particles.

The thus obtained composite particles were in the form of granular particles having an average particle diameter of 0.246 $\mu$m, and had a BET specific surface area value of 15.1 m$^2$/g; a L* value of 23.48; a tinting strength of 182%; a repose angle of 370; a volume resistivity value of $5.9\times10^4$ $\Omega\cdot$cm; an ultraviolet light-shielding property of 94%; a surface activity of 6.9%; a light resistance (E* value) of 2.09; a black pigment desorption percentage of 8.1%; and a coating amount of methyl hydrogen polysiloxane of 0.52% by weight (calculated as C). In addition, it was confirmed that the amount of the black pigments C-1 coated was 48.76% by weight (calculated as C; corresponding to 100 parts by weight based on 100 parts by weight of the titanium oxide particles).

As a result of observing the micrograph, since almost no black pigments C-1 were recognized from the micrograph, it was confirmed that a substantially whole amount of the black pigments C-1 used contributed to the formation of the black pigment coat on the coating layer composed of methyl hydrogen polysiloxane.

Example 8

<Production of Solvent-Based Paint Containing Composite Particles>

10 g of the composite particles produced in Example 7, were blended with an amino alkyd resin and a thinner at the following weight ratio, and charged into a 140-ml glass bottle together with 90 g of 3 mm$\phi$ glass beads. Next, the obtained mixture was mixed and dispersed for 90 minutes by a paint shaker, thereby preparing a mill base.

Composition of Mill Base:

| | |
|---|---|
| Composite particles | 12.2 parts by weight |
| Amino alkyd resin (AMILAC No. 1026, produced by KANSAI PAINT CO., LTD.) | 19.5 parts by weight |
| Thinner | 7.3 parts by weight |

The above-prepared mill base was blended with an amino alkyd resin at the following weight ratio, and the obtained mixture was further mixed and dispersed for 15 minutes by a paint shaker, thereby obtaining a solvent-based paint containing the composite particles.

Composition of Paint:

| | |
|---|---|
| Mill base | 39.0 parts by weight |
| Amino alkyd resin (AMILAC No. 1026, produced by KANSAI PAINT CO., LTD.) | 61.0 parts by weight |

The thus obtained solvent-based paint exhibited a viscosity of 1,024 cP and a storage stability ($\Delta E^*$ value) of 0.90.

Next, the thus prepared solvent-based paint was applied onto a cold-rolled steel plate (0.8 mm×70 mm×150 mm; JIS G-3141) and dried to form a coating film having a thickness of 150 $\mu$m. The obtained coating film showed a gloss of 95%, a L* value of 24.31 and a light resistance ($\Delta E^*$ value) of 2.32.

Example 9

<Production of Water-Based Paint Containing Composite Particles>

7.62 g of the composite particles obtained in Example 7, were blended with a water-soluble alkyd resin and the like at the following weight ratio, and charged into a 140-ml glass bottle together with 90 g of 3 mm$\phi$ glass beads. Next, the obtained mixture was mixed and dispersed for 90 minutes by a paint shaker, thereby preparing a mill base.

Composition of Mill Base:

| | |
|---|---|
| Composite particles | 12.4 parts by weight |
| Water-soluble alkyd resin (tradename: "S-118", produced by DAI-NIPPON INK KAGAKU KOGYO CO., LTD.) | 9.0 parts by weight |

-continued

| | |
|---|---|
| Defoamer (tradename: "NOPCO 8034", produced by SUN NOPCO CO., LTD.) | 0.1 part by weight |
| Water | 4.8 parts by weight |
| Butyl cellosolve | 4.1 parts by weight |

The above-prepared mill base was blended with paint components shown below at the following weight ratio, and the obtained mixture was further mixed and dispersed for 15 minutes by a paint shaker, thereby obtaining a water-based paint containing the composite particles.

Composition of Paint:

| | |
|---|---|
| Mill base | 30.4 parts by weight |
| Water-soluble alkyd resin (tradename: S-118, produced by DAI-NIPPON INK KAGAKU KOGYO CO., LTD.) | 46.2 parts by weight |
| Water-soluble melamine resin (tradename: S-695, produced by DAI-NIPPON INK KAGAKU KOGYO CO., LTD.) | 12.6 parts by weight |
| Defoamer (tradename: "NOPCO 8034", produced by SUN NOPCO CO., LTD.) | 0.1 part by weight |
| Water | 9.1 parts by weight |
| Butyl cellosolve | 1.6 parts by weight |

The thus obtained water-based paint exhibited a viscosity of 2,418 cP and a storage stability ($\Delta E^*$ value) of 0.90.

Next, the thus prepared water-based paint was applied onto a cold-rolled steel plate (0.8 mm×70 mm×150 mm; JIS G-3141) and dried to form a coating film having a thickness of 150 μm. The obtained coating film showed a gloss of 90%, a $L^*$ value of 24.83 and a light resistance ($\Delta E^*$ value) of 2.30.

Example 10

<Production of Resin Composition>2.5 g of the composite particles obtained in Example 7, and 47. 5 g of polyvinyl chloride resin particles 103EP8D (produced by NIPPON ZEON CO., LTD.) were weighed and charged into a 100-ml beaker made of resins, and intimately mixed together by a spatula, thereby obtaining mixed particles.

0.5 g of calcium stearate was added to the obtained mixed particles. The mixed particles were intimately mixed and then slowly supplied to hot rolls heated to 160° C. whose clearance was set to 0.2 mm, and continuously kneaded therebetween until a uniform resin composition was produced. The resin composition kneaded was separated from the hot rolls and used as a raw material for forming a colored resin plate.

Next, the thus-produced resin composition was interposed between a pair of surface-polished stainless steel plates, placed within a hot press heated to 180° C. and then subjected to a pressure molding while applying a pressure of 98 MPa (1 ton/cm$^2$) thereto, thereby obtaining a colored resin plate having a thickness of 1 mm. The thus-produced colored resin plate had a dispersing condition of Rank 5, a hue ($L^*$ value) of 25.11 and a light resistance ($\Delta E^*$ value) of 2.46.

The obtained colored resin plate was cut into test pieces of 1.5 cm square. Three test pieces were placed in a Geer oven heated to 190° C., and taken out therefrom one by one at 30 minute, 60 minute and 120 minute, respectively, after starting the examination to examine the deterioration of resin. As a result, it was confirmed that the degree of resin deterioration, i.e., the anti-aging property ($S/S_0 \times 100$) was 0% after 30 minutes, 5% after 60 minutes and 5% after 120 minutes.

Core Particles 1 to 3:

Various silica particles as core particles 1 to 3 having properties shown in Table 1 were prepared.

Core Particles 4:

A slurry containing silica particles was obtained by dispersing 20 kg of silica particles (deaggregated core particles 1) in 150 liters of water. The pH value of the thus obtained slurry containing the silica particles was adjusted to 10.5 by using an aqueous sodium hydroxide solution, and then the concentration of the slurry was adjusted to 98 g/liter by adding water thereto. After 150 liters of the slurry was heated to 60° C., 2722 ml of a 1.0 mol/liter $NaAlO_2$ solution (corresponding to 0.5% by weight (calculated as Al) based on the weight of the silica particles) was added to the slurry. After allowing the obtained slurry to stand for 30 minutes, the pH value of the slurry was adjusted to 7.5 by using acetic acid. After further allowing the resultant slurry to stand for 30 minutes, the slurry was subjected to filtration, washing with water, drying and pulverization, thereby obtaining the silica particles coated with hydroxides of aluminum.

The essential production conditions and various properties of the obtained surface-treated silica particles are shown in Table 2.

Core particles 5 and 6:

The same procedure as defined for the production of the above core particles 4, was conducted except that the core particles 5 and 6 were respectively used instead of the core particles 1, and kinds and amounts of hydroxides and/or oxides of aluminum and/or silicon coats were changed variously, thereby obtaining silica particles coated with the hydroxides and/or oxides of aluminum and/or silicon coat.

The essential production conditions and various properties of the obtained surface-treated silica particles are shown in Table 2.

Meanwhile, in Tables, "A" as described in "kind of coating material used in surface-treating step" represents hydroxides of aluminum.

Examples 11 to 16 and Comparative Examples 1 to 2:

The same procedure as defined in Example 1 was conducted except that kinds of core particles; use or non-use, kinds and amounts of alkoxysilanes or polysiloxanes added; conditions for edge runner treatment used in the coating step with alkoxysilanes or polysiloxanes; kinds and amounts of fine carbon black particles added; and conditions for edge runner treatment used in the carbon black-coating step, were changed variously, thereby obtaining black composite pigments. In the case of the black composite particles obtained in Examples 11 to 16, as a result of observing the micrograph, since almost no carbon black was recognized from the micrograph, it was confirmed that a substantially whole amount of the carbon black used contributed to the formation of the carbon black coat on the coating layer composed of alkoxysilanes or polysiloxanes.

Various properties of the fine carbon black particles A to C used are shown in Table 3.

The essential production conditions are shown in Table 4, and various properties of the obtained composite particles are shown in Table 5.

Comparative Example 3

(Follow-Us Test of Example 1 of Japanese Patent No. 3160552)

The silica particles as core particles 1 were charged into a rotary continuous-heating furnace. An inside of the furnace was fully purged with nitrogen to adjust the oxygen concentration therein to not more than 0.3% by volume. Then, while flowing a mixed gas of nitrogen and propane (a mixing volume ratio: 10:1) through the furnace, the inside of the furnace was heated to 900° C. to thermally decompose the propane, thereby forming a carbon coat on the surface of the respective silica particles. It was confirmed that the amount of the carbon coat was 20 parts by weight based on 100 parts by weight of the silica particles.

Various properties of the obtained black silica particles are shown in Table 5.

Example 17

20 g of calcium stearate was added to 2 kg of the black composite particles, and the resultant mixture was heated up to 120° C. for 30 minutes while stirring by a Henschel mixer. The mixture was held under the above condition for 45 minutes, and then cooled to room temperature for 30 minutes, thereby obtaining surface-coated black composite particles.

The essential production conditions are shown in Table 6, and various properties of the obtained surface-coated composite particles are shown in Table 7.

Examples 18 and 19

The same procedure as defined in Example 17 was conducted except that kinds of composite particles; kinds and amounts of fatty acid, metal salt of fatty acid or coupling agent coated; and kneading temperature and kneading time for the coating step using Henschel mixer, were changed variously, thereby obtaining surface-coated composite particles.

The essential production conditions are shown in Table 6, and various properties of the obtained composite particles are shown in Table 7.

Examples 20 to 28 and Comparative Examples 4 to 8

The same procedure as defined in Example 2 was conducted except that kinds of fillers were changed variously, thereby obtaining tread rubber compositions.

The essential production conditions and various properties of the obtained tread rubber compositions are shown in Table 8.

Core Particles 7 to 12:

Various white inorganic particles as core particles 7 to 10 having properties shown in Table 9 were prepared. In addition, for comparative purpose, iron oxide particles as core particles 11 and 12 were prepared.

Core Particles 13:

A slurry containing silica particles was obtained by dispersing 20 kg of silica particles (core particles 7) in 150 liters of water. The pH value of the thus obtained re-dispersed slurry containing the silica particles was adjusted to 10.5 by using an aqueous sodium hydroxide solution, and then the concentration of the slurry was adjusted to 98 g/liter by adding water thereto. After 150 liters of the slurry was heated to 60° C., 2722 ml of a 1.0 mol/liter sodium aluminate solution (corresponding to 0.5% by weight (calculated as Al) based on the weight of the silica particles) was added to the slurry. After allowing the obtained slurry to stand for 30 minutes, the pH value of the slurry was adjusted to 7.5 by using acetic acid. After further allowing the resultant slurry to stand for 30 minutes, the slurry was subjected to filtration, washing with water, drying and pulverization, thereby obtaining the silica particles coated with hydroxides of aluminum.

The essential production conditions are shown in Table 10, and various properties of the obtained surface-treated silica particles are shown in Table 11.

Core Particles 14 to 16:

The same procedure as defined for the production of the above core particles 13, was conducted except that the white inorganic particles as core particles 8 to 10 were respectively used instead of the core particles 7, and kinds and amounts of surface coating materials were changed variously, thereby obtaining white inorganic particles whose surface was coated with the coating material.

The essential production conditions are shown in Table 10, and various properties of the obtained surface-treated white inorganic particles are shown in Table 11.

Meanwhile, in Tables, "A" and "S" as described in "kind of coating material used in surface-treating step" represent hydroxides of aluminum and oxides of silicon, respectively.

Black Pigments:

Black pigments having properties as shown in Table 12 were prepared.

Examples 29 to 36 and Comparative Examples 9 to 12

The same procedure as defined in Example 3 was conducted except that kinds and amounts of additives added in coating step with gluing agent, linear load and treating time for edge runner treatment used in the coating step with gluing agent, kinds and amounts of black pigments coated in black pigment-coating step, and linear load and treating time for edge runner treatment used in the black pigment-coating step, were changed variously, thereby obtaining black composite particles.

The essential production conditions are shown in Table 13, and various properties of the obtained black composite particles are shown in Table 14.

Meanwhile, in Example 29, the black pigments C-1 were added five times in an amount of 20.0 parts by weight each, to 100.0 parts by weight of the core particles such that the total amount of the black pigments C-1 added was 100.0 parts by weight. In Example 33, 150.0 parts by weight of the black pigments C-2 were continuously added to 100.0 parts by weight of the core particles for 150 minutes.

Examples 37 to 44 and Comparative Examples 13 to 22

<Solvent-Based Paint>

The same procedure as defined in Example 4 was conducted except that kinds and amounts of black composite particles and black pigments added were changed variously, thereby obtaining solvent-based paints.

Various properties of the obtained solvent-based paints and various properties of coating films obtained therefrom are shown in Tables 15 and 16.

Examples 45 to 52 and Comparative Examples 23 to 32

<Water-Based Paint>

The same procedure as defined in Example 5 was conducted except that kinds and amounts of the black composite particles and black pigments added were changed variously, thereby obtaining water-based paints.

Various properties of the obtained water-based paints and various properties of coating films obtained therefrom are shown in Tables 17 and 18.

Examples 53 to 60 and Comparative Examples 33 to 42

<Resin Composition>

The same procedure as defined in Example 6 was conducted except that kinds and amounts of the black composite particles and black pigments added were changed variously, thereby obtaining resin compositions.

The essential production conditions and various properties of the obtained resin compositions are shown in Tables 19 and 20.

Core Particles 17 to 19:

Various white inorganic particles as core particles 17 to 19 having properties shown in Table 21 were prepared.

Core Particles 20:

A slurry containing titanium oxide particles was obtained by dispersing 20 kg of titanium oxide particles (core particles 17) in 150 liters of water. The pH value of the thus obtained re-dispersed slurry containing the titanium oxide particles was adjusted to 10.5 by using an aqueous sodium hydroxide solution, and then the concentration of the slurry was adjusted to 98 g/liter by adding water thereto. After 150 liters of the slurry was heated to 60° C., 5444 ml of a 1.0 mol/liter sodium aluminate solution (corresponding to 1.0% by weight (calculated as Al) based on the weight of the titanium oxide particles) was added to the slurry. After allowing the obtained slurry to stand for 30 minutes, the pH value of the slurry was adjusted to 7.5 by using acetic acid. After further allowing the resultant slurry to stand for 30 minutes, the slurry was subjected to filtration, washing with water, drying and pulverization, thereby obtaining the titanium oxide particles coated with hydroxides of aluminum.

The essential production conditions are shown in Table 22, and various properties of the obtained surface-treated titanium oxide particles are shown in Table 23.

Core Particles 21 and 22:

The same procedure as defined for the production of the above core particles 20, was conducted except that the white inorganic particles as core particles 18 and 19 were respectively used instead of the core particles 17, and kinds and amounts of surface coating materials were changed variously, thereby obtaining white inorganic particles whose surface was coated with the coating material.

The essential production conditions are shown in Table 22, and various properties of the obtained surface-treated white inorganic particles are shown in Table 23.

Meanwhile, in Tables, "A" and "S" as described in "kind of coating material used in surface-treating step" represent hydroxides of aluminum and oxides of silicon, respectively.

Black Pigments:

Black pigments having properties as shown in Table 12 were prepared.

Examples 61 to 66 and Comparative Examples 43 to 47

The same procedure as defined in Example 7 was conducted except that kinds and amounts of additives added in coating step with gluing agent, linear load and treating time for edge runner treatment used in the coating step with gluing agent, kinds and amounts of black pigments coated in black pigment-coating step, and linear load and treating time for edge runner treatment used in the black pigment-coating step, were changed variously, thereby obtaining composite particles.

The essential production conditions are shown in Table 24, and various properties of the obtained composite particles are shown in Table 25.

Meanwhile, in Example 62, the black pigments C-2 were added five times in an amount of 20.0 parts by weight each, to 100.0 parts by weight of the core particles such that the total amount of the black pigments C-2 added was 100.0 parts by weight. In Example 64, 75.0 parts by weight of the black pigments C-2 were continuously added to 100.0 parts by weight of the core particles for 75 minutes.

Examples 67 to 72 and Comparative Examples 48 to 55

<Solvent-Based Paint>

The same procedure as defined in Example 8 was conducted except that kinds and amounts of composite particles and black pigments added were changed variously, thereby obtaining solvent-based paints.

Various properties of the obtained solvent-based paints and various properties of coating films obtained therefrom are shown in Tables 26 and 27.

Examples 73 to 78 and Comparative Examples 56 to 63

<Water-Based Paint>

The same procedure as defined in Example 9 was conducted except that kinds and amounts of composite particles and black pigments added were changed variously, thereby obtaining water-based paints.

Various properties of the obtained water-based paints and various properties of coating films obtained therefrom are shown in Tables 28 and 29.

Examples 79 to 84 and Comparative Examples 64 to 71

<Resin Composition>

The same procedure as defined in Example 10 was conducted except that kinds and amounts of composite particles and black pigments added were changed variously, thereby obtaining resin compositions.

The essential production conditions and various properties of the obtained resin compositions are shown in Tables 30 and 31.

TABLE 1

| | Properties of silica particles | | | |
|---|---|---|---|---|
| Kind of core particles | Shape | Average particle diameter ($\mu$m) | BET specific surface area value ($m^2/g$) | Volume resistivity value ($\Omega \cdot cm$) |
| Core particles 1 | Granular | 0.021 | 198.3 | $2.3 \times 10^7$ |
| Core particles 2 | Granular | 0.014 | 254.6 | $1.6 \times 10^6$ |
| Core particles 3 | Granular | 0.084 | 100.3 | $5.6 \times 10^7$ |

TABLE 2

| | | Surface-treating step | | | | | Properties of surface-treated silica particles | | |
|---|---|---|---|---|---|---|---|---|---|
| | | Additives | | | Coating material | | Average | BET specific | Volume |
| Core particles | Kind of core particles | Kind | Calculated as | Amount (wt. %) | Kind | Calculated as | Amount (wt. %) | particle diameter (μm) | surface area value (m²/g) | resistivity value (Ω·cm) |
| Core particles 4 | Core particles 1 | Sodium aluminate | Al | 0.5 | A | Al | 0.49 | 0.022 | 186.3 | 6.8 × 10⁷ |
| Core particles 5 | Core particles 2 | Aluminum sulfate | Al | 2.0 | A | Al | 1.96 | 0.015 | 211.4 | 2.6 × 10⁷ |
| Core particles 6 | Core particles 3 | Aluminum sulfate | Al | 5.0 | A | Al | 4.76 | 0.086 | 96.5 | 8.3 × 10⁷ |

Note: Volume resistivity values are $6.8 \times 10^7$, $2.6 \times 10^7$, $8.3 \times 10^7$ Ω·cm respectively.

TABLE 3

| Kind of fine carbon black particles | Shape | Properties of fine carbon black particles | | |
|---|---|---|---|---|
| | | Average particle diameter (μm) | BET specific surface area value (m²/g) | Blackness (L* value) (−) |
| Carbon black A | Granular | 0.022 | 133.5 | 14.6 |
| Carbon black B | Granular | 0.015 | 265.3 | 15.2 |
| Carbon black C | Granular | 0.030 | 84.6 | 17.0 |

TABLE 4

| | | Production of black composite particles | | | | | | | | | |
|---|---|---|---|---|---|---|---|---|---|---|---|
| | | Coating step with alkoxysilanes or polysiloxanes | | | | | Coating step with carbon black | | | | |
| | | Additives | | Edge runner treatment | | Coating amount | | | Edge runner treatment | | Amount coated |
| Examples and Comparative Examples | Kind of core particles | Kind | Amount added (wt. part) | Linear load (N/cm) | Linear load (Kg/cm) | Time (min) | (calculated as C) (wt. %) | Carbon black Kind | Amount added (wt. part) | Linear load (N/cm) | Linear load (Kg/cm) | Time (min) | (calculated as C) (wt. %) |
| Example 11 | Core particles 1 | Methyl hydrogen polysiloxane | 3.0 | 441 | 45 | 20 | 0.78 | A | 50.0 | 588 | 60 | 60 | 33.11 |
| Example 12 | Core particles 2 | Phenyl triethoxysilane | 2.0 | 588 | 60 | 20 | 0.70 | B | 100.0 | 588 | 60 | 80 | 49.72 |
| Example 13 | Core particles 3 | Methyl triethoxysilane | 5.0 | 588 | 60 | 30 | 0.31 | C | 150.0 | 735 | 75 | 120 | 58.92 |
| Example 14 | Core particles 4 | Methyl hydrogen polysiloxane | 1.5 | 294 | 30 | 30 | 0.39 | A | 20.0 | 588 | 60 | 50 | 16.55 |
| Example 15 | Core particles 5 | Methyl trimethoxysilane | 3.0 | 735 | 75 | 30 | 0.25 | B | 80.0 | 588 | 60 | 60 | 44.17 |
| Example 16 | Core particles 6 | Methyl triethoxysilane | 2.0 | 294 | 30 | 30 | 0.13 | C | 160.0 | 735 | 75 | 120 | 61.02 |

TABLE 4-continued

Production of black composite particles

| | | Coating step with alkoxysilanes or polysiloxanes | | | | | Coating step with carbon black | | | | | |
|---|---|---|---|---|---|---|---|---|---|---|---|---|
| | | Additives | | Edge runner treatment | | Coating amount (calculated as C) (wt. %) | | Carbon black Amount added (wt. part) | Edge runner treatment | | Amount coated (calculated as C) (wt. %) |
| Examples and Comparative Examples | Kind of core particles | Kind | Amount added (wt. part) | Linear load (N/cm) | Time (min) | | Kind | | Linear load (N/cm) | Time (min) | |
| Comparative Example 1 | Core particles 1 | — | — | — | — | — | A | 50.0 | 588 | 60 | 33.08 |
| Comparative Example 2 | Core particles 1 | Methyl hydrogen polysiloxane | 3.0 | 588 | 60 | 0.78 | A | 0.5 | 588 | 60 | 0.48 |

Note: In Comparative Example 2 row — Edge runner treatment Time = 20 (min).

TABLE 5

Properties of black composite particles

| Examples and Comparative Examples | Average particle diameter (μm) | BET specific surface area value (m²/g) | Volume resistivity value (Ω · cm) | Blackness (L* value) (−) | Light resistance (ΔE* value) (−) | Carbon black desorption percentage (%) |
|---|---|---|---|---|---|---|
| Example 11 | 0.023 | 154.3 | $1.6 \times 10^2$ | 16.4 | 2.9 | 5.5 |
| Example 12 | 0.018 | 196.4 | $8.1 \times 10^1$ | 16.2 | 2.5 | 6.6 |
| Example 13 | 0.090 | 86.3 | $9.6 \times 10^1$ | 17.3 | 2.3 | 8.3 |
| Example 14 | 0.023 | 171.2 | $4.3 \times 10^2$ | 19.1 | 2.2 | 2.1 |
| Example 15 | 0.018 | 183.8 | $6.4 \times 10^1$ | 16.5 | 1.7 | 3.4 |
| Example 16 | 0.092 | 81.6 | $8.1 \times 10^1$ | 17.3 | 1.4 | 4.2 |
| Comparative Example 1 | 0.022 | 170.1 | $2.8 \times 10^3$ | 22.6 | 6.2 | 81.6 |
| Comparative Example 2 | 0.021 | 188.7 | $4.8 \times 10^6$ | 35.8 | 10.3 | — |
| Comparative Example 3 | 0.022 | 175.9 | $8.7 \times 10^2$ | 21.8 | 6.5 | 73.9 |

TABLE 6

Coating step with fatty acid, fatty acid metal salt or coupling agent

| | Black composite particles | Additives | | Production of surface-coated black composite particles | | |
|---|---|---|---|---|---|---|
| Examples | Kind of black composite particles | Kind | Amount added (wt. part) | Kneading temperature (° C.) | Kneading time (min) | Coating amount (calculated as C) (wt. %) |
| Example 17 | Example 11 | Calcium stearate | 1.0 | 120 | 45 | 0.70 |
| Example 18 | Example 14 | Magnesium stearate | 1.5 | 120 | 30 | 1.05 |
| Example 19 | Example 13 | γ-mercaptopropyl trimethoxysilane | 1.0 | 80 | 30 | 0.35 |

TABLE 7

Properties of surface-coated black composite particles

| Examples | Average particle diameter (μm) | BET specific surface area value (m²/g) | Blackness (L* value) (—) | Volume resistivity value (Ω · cm) | Light resistance (ΔE* value) (—) |
|---|---|---|---|---|---|
| Example 17 | 0.023 | 149.1 | 16.5 | $2.2 \times 10^2$ | 2.6 |
| Example 18 | 0.023 | 163.8 | 19.3 | $4.6 \times 10^2$ | 2.0 |
| Example 19 | 0.090 | 81.4 | 17.4 | $1.7 \times 10^2$ | 2.1 |

TABLE 8

| | Production of tread rubber composition Fillers | | Properties of tread rubber composition | | | | |
|---|---|---|---|---|---|---|---|
| Examples and Comparative Examples | Kind | Amount blended (wt. part) | Dispersing condition (—) | Wear resistance (—) | Electric resistance value (Ω · cm) | Tensile strength (MPa) | Light resistance (ΔE* value) (—) |
| Example 20 | Example 11 | 50.0 | 5 | 106 | $3.6 \times 10^4$ | 24.5 | 4.2 |
| Example 21 | Example 12 | 50.0 | 5 | 108 | $4.1 \times 10^3$ | 24.9 | 3.8 |
| Example 22 | Example 13 | 50.0 | 4 | 112 | $7.2 \times 10^2$ | 25.1 | 3.5 |
| Example 23 | Example 14 | 50.0 | 5 | 111 | $6.9 \times 10^4$ | 23.9 | 4.1 |
| Example 24 | Example 15 | 50.0 | 5 | 113 | $8.8 \times 10^3$ | 24.9 | 3.4 |
| Example 25 | Example 16 | 50.0 | 5 | 117 | $4.1 \times 10^2$ | 25.5 | 2.9 |
| Example 26 | Example 17 | 50.0 | 5 | 112 | $9.5 \times 10^3$ | 24.7 | 3.9 |
| Example 27 | Example 18 | 50.0 | 5 | 114 | $3.3 \times 10^3$ | 25.0 | 3.6 |
| Example 28 | Example 19 | 50.0 | 5 | 119 | $6.7 \times 10^2$ | 25.8 | 3.2 |
| Comparative Example 4 | Carbon black A | 50.0 | 4 | 100 | $2.8 \times 10^2$ | 25.0 | 5.3 |
| Comparative Example 5 | Core particles 1 | 50.0 | 1 | 84 | $1.9 \times 10^{12}$ | 22.5 | — |
| Comparative Example 6 | Comparative Example 1 | 50.0 | 2 | 93 | $6.5 \times 10^5$ | 22.9 | 6.5 |
| Comparative Example 7 | Comparative Example 2 | 50.0 | 1 | 87 | $4.4 \times 10^{11}$ | 22.6 | 10.9 |
| Comparative Example 8 | Comparative Example 3 | 50.0 | 2 | 92 | $7.9 \times 10^5$ | 22.8 | 7.0 |

TABLE 9

| Kind of core particles | Properties of white inorganic particles | |
|---|---|---|
| | Kind | Shape |
| Core particles 7 | Silica | Spherical |
| Core particles 8 | Silica | Spherical |
| Core particles 9 | Precipitated barium sulfate | Granular |
| Core particles 10 | Calcium carbonate | Granular |
| Core particles 11 | Mn-containing hematite particles | Granular |
| Core particles 12 | Magnetite | Spherical |

TABLE 9

| | Properties of white inorganic particles | | | | | | | |
|---|---|---|---|---|---|---|---|---|
| Kind of core particles | Average particle diameter (μm) | BET specific surface area value (m²/g) | Hue L* value (—) | a* value (—) | b* value (—) | C* value (—) | Refractive index (—) | Light resistance (ΔE* value) (—) |
| Core particles 7 | 3.915 | 0.7 | 95.28 | 0.16 | 0.88 | 0.89 | 1.42 | 5.74 |
| Core particles 8 | 0.603 | 3.8 | 96.13 | 0.08 | 0.96 | 0.96 | 1.40 | 5.38 |

TABLE 9-continued

Properties of white inorganic particles

| Kind of core particles | Average particle diameter (μm) | BET specific surface area value (m²/g) | Hue L* value (-) | a* value (-) | b* value (-) | C* value (-) | Refractive index (-) | Light resistance (ΔE* value) (-) |
|---|---|---|---|---|---|---|---|---|
| Core particles 9 | 0.059 | 21.3 | 91.62 | 0.31 | 1.03 | 1.08 | 1.62 | 5.92 |
| Core particles 10 | 0.140 | 18.6 | 93.65 | 0.06 | 1.11 | 1.11 | 1.49 | 7.01 |
| Core particles 11 | 0.323 | 3.1 | 22.44 | 4.28 | 3.01 | 5.23 | 2.92 | 7.22 |
| Core particles 12 | 0.230 | 11.8 | 20.10 | 1.53 | 2.16 | 2.65 | 2.42 | 6.69 |

TABLE 10

Surface-treating step

| Core particles | Kind of core particles | Additives Kind | Calculated as | Amount (wt. %) | Coating material Kind | Calculated as | Amount (wt. %) |
|---|---|---|---|---|---|---|---|
| Core particles 13 | Core particles 7 | Sodium aluminate | Al | 0.5 | A | Al | 0.49 |
| Core particles 14 | Core particles 8 | Aluminum sulfate | Al | 2.0 | A | Al | 1.96 |
| Core particles 15 | Core particles 9 | Sodium aluminate | Al | 2.0 | A | Al | 1.93 |
|  |  | Water glass #3 | SiO₂ | 0.5 | S | SiO₂ | 0.47 |
| Core particles 16 | Core particles 10 | Water glass #3 | SiO₂ | 1.0 | S | SiO₂ | 0.98 |

TABLE 11

Properties of surface-treated white inorganic particles

| Kind of core particles | Average particle diameter (μm) | BET specific surface area value (m²/g) | Hue L* value (-) | a* value (-) | b* value (-) | C* value (-) | Refractive index (-) | Light resistance (ΔE* value) (-) |
|---|---|---|---|---|---|---|---|---|
| Core particles 13 | 3.916 | 1.2 | 94.95 | 0.12 | 0.94 | 0.95 | 1.42 | 5.56 |
| Core particles 14 | 0.610 | 4.6 | 93.15 | 0.11 | 0.93 | 0.94 | 1.41 | 5.08 |
| Core particles 15 | 0.061 | 21.9 | 91.03 | 0.44 | 0.81 | 0.92 | 1.62 | 5.32 |
| Core particles 16 | 0.141 | 17.9 | 92.16 | 0.08 | 1.10 | 1.10 | 1.49 | 6.98 |

TABLE 12

Properties of black pigments

| Black pigments | Kind | Shape | Average particle diameter (μm) | BET specific surface area value (m²/g) | Hue L* value (-) | a* value (-) | b* value (-) | Volume resistivity value (Ω·cm) | Light resistance (ΔE* value) (-) |
|---|---|---|---|---|---|---|---|---|---|
| Black pigments C-1 | Carbon black | Granular | 0.02 | 134.0 | 16.60 | 0.93 | 0.73 | $2.0 \times 10^2$ | 12.65 |
| Black pigments C-2 | Aniline black | Rod-shaped | 0.31 | 56.8 | 16.20 | −1.03 | 0.46 | $3.6 \times 10^{11}$ | 15.21 |

TABLE 13

| | | Production of black composite particles | | | | | | | | | |
|---|---|---|---|---|---|---|---|---|---|---|---|
| | | Coating step with gluing agent | | | | | Coating step with black pigments | | | | |
| | | gluing agent Additives | | Edge runner treatment | | Coating amount | Pigments | | Edge runner treatment | | Amount coated |
| Examples and Comparative Examples | Kind of core particles | Kind | Amount added (wt. part) | Linear load (N/cm) | Time (min) | (calculated as C) (wt. %) | Kind | Amount added (wt. part) | Linear load (N/cm) (Kg/cm) | Time (min) | (calculated as C) (wt. %) |
| Example 29 | Core particles 7 | Methyl triethoxysilane | 1.0 | 588  60 | 60 | 0.06 | C-1 | 100.0 | 588  60 | 120 | 49.79 |
| Example 30 | Core particles 8 | Methyl hydrogen polysiloxane | 1.0 | 588  60 | 30 | 0.26 | C-1 | 10.0 | 392  40 | 180 | 9.03 |
| Example 31 | Core particles 9 | Phenyl triethoxysilane | 2.0 | 392  40 | 60 | 0.70 | C-1 | 50.0 | 392  40 | 120 | 4.68 |
| Example 32 | Core particles 10 | Methyl triethoxysilane | 1.5 | 392  40 | 60 | 0.10 | C-2 | 10.0 | 392  40 | 180 | 7.37 |
| Example 33 | Core particles 13 | γ-aminopropyl triethoxysilane | 0.5 | 588  60 | 20 | 0.08 | C-2 | 150.0 | 588  60 | 60 | 49.06 |
| Example 34 | Core particles 14 | Dimethyl dimethoxysilane | 1.0 | 735  75 | 30 | 0.19 | C-1 | 10.0 | 392  40 | 120 | 9.02 |
| Example 35 | Core particles 15 | Polyvinyl alcohol | 1.0 | 294  30 | 20 | 0.54 | C-2 | 2.0 | 392  40 | 120 | 1.55 |
| Example 36 | Core particles 16 | Isopropyl triisostearoyl titanate | 2.0 | 441  45 | 30 | 1.47 | C-1 | 5.0 | 392  40 | 60 | 4.70 |
| Comparative Example 9 | Core particles 8 | — | — | — | — | — | C-1 | 10.0 | 588  60 | 60 | 9.01 |
| Comparative Example 10 | Core particles 8 | Methyl triethoxysilane | 1.0 | 588  60 | 60 | 0.06 | C-1 | 750.0 | 588  60 | 60 | 88.02 |
| Comparative Example 11 | Core particles 11 | Methyl triethoxysilane | 1.0 | 588  60 | 60 | 0.06 | C-1 | 10.0 | 588  60 | 60 | 9.01 |
| Comparative Example 12 | Core particles 12 | Methyl triethoxysilane | 1.0 | 588  60 | 60 | 0.06 | C-1 | 10.0 | 588  60 | 60 | 9.01 |

TABLE 14

| | Properties of black composite particles | | | | | | | | |
|---|---|---|---|---|---|---|---|---|---|
| Examples and Comparative Examples | Average particle diameter (μm) | BET specific surface area value (m$^2$/g) | Blackness (L* value) (-) | Tinting strength (%) | Repose angle (°) | Volume resistivity value (Ω·cm) | Surface activity (%) | Light resistance (ΔE* value) (-) | Black pigment desorption percentage (%) |
| Example 29 | 3.919 | 132.8 | 17.03 | 208 | 33 | $2.3 \times 10^4$ | 0.47 | 1.65 | 7.1 |
| Example 30 | 0.604 | 6.8 | 19.59 | 129 | 36 | $1.6 \times 10^5$ | 0.88 | 2.31 | 6.3 |
| Example 31 | 0.060 | 25.6 | 20.11 | 127 | 38 | $6.8 \times 10^{10}$ | 1.04 | 2.48 | 5.6 |
| Example 32 | 0.141 | 21.3 | 19.62 | 126 | 39 | $6.5 \times 10^{10}$ | 0.92 | 2.44 | 5.9 |
| Example 33 | 3.922 | 87.3 | 16.93 | 188 | 32 | $2.1 \times 10^{11}$ | 0.41 | 1.72 | 4.9 |
| Example 34 | 0.611 | 5.6 | 19.48 | 130 | 35 | $3.6 \times 10^5$ | 0.76 | 2.00 | 3.2 |
| Example 35 | 0.061 | 26.6 | 21.82 | 116 | 41 | $1.8 \times 10^{10}$ | 1.59 | 3.17 | 1.6 |
| Example 36 | 0.143 | 19.8 | 17.94 | 175 | 34 | $6.9 \times 10^4$ | 0.55 | 1.69 | 4.3 |
| Comparative Example 9 | 0.603 | 7.7 | 21.44 | 100 | 48 | $6.3 \times 10^5$ | 2.18 | 6.16 | 66.1 |
| Comparative Example 10 | 0.616 | 121.3 | 16.93 | 194 | 53 | $5.3 \times 10^2$ | 2.69 | 6.13 | 31.3 |
| Comparative Example 11 | 0.324 | 6.3 | 18.22 | 127 | 46 | $2.1 \times 10^4$ | 2.24 | 5.38 | 6.1 |
| Comparative Example 12 | 0.231 | 14.8 | 17.38 | 130 | 48 | $1.6 \times 10^4$ | 2.35 | 5.72 | 6.2 |

TABLE 15

| Examples | Production of paint | | | | Properties of paint | | Properties of coating film | | |
|---|---|---|---|---|---|---|---|---|---|
| | Black composite particles | | Black pigments | | | | | Blackness | Light resistance |
| | Kind | Amount added (wt. part) | Kind | Amount added (wt. part) | Viscosity (cP) | Storage stability (-) | 60° gloss (%) | (L* value) (-) | (ΔE* value) (-) |
| Example 37 | Example 29 | 12.2 | — | — | 1,280 | 0.73 | 94 | 17.29 | 1.96 |
| Example 38 | Example 30 | 12.2 | — | — | 1,162 | 0.90 | 93 | 19.92 | 2.51 |
| Example 39 | Example 31 | 12.2 | — | — | 1,068 | 0.96 | 91 | 20.45 | 2.69 |
| Example 40 | Example 32 | 12.2 | — | — | 962 | 0.81 | 90 | 19.83 | 2.65 |
| Example 41 | Example 33 | 12.2 | — | — | 983 | 0.65 | 98 | 17.44 | 1.97 |
| Example 42 | Example 34 | 12.2 | — | — | 1,024 | 0.86 | 98 | 19.65 | 2.26 |
| Example 43 | Example 35 | 12.2 | — | — | 1,380 | 1.31 | 91 | 22.00 | 3.43 |
| Example 44 | Example 36 | 12.2 | — | — | 1,260 | 0.72 | 96 | 18.32 | 1.91 |

TABLE 16

| Comparative Examples | Production of paint | | | | Properties of paint | | Properties of coating film | | |
|---|---|---|---|---|---|---|---|---|---|
| | Particles | | Black pigments | | | | | Blackness | Light resistance |
| | Kind | Amount added (wt. part) | Kind | Amount added (wt. part) | Viscosity (cP) | Storage stability (-) | 60° gloss (%) | (L* value) (-) | (ΔE* value) (-) |
| Comparative Example 13 | — | — | C-1 | 12.2 | 25,600 | 2.16 | 63 | 16.95 | 9.16 |
| Comparative Example 14 | — | — | C-2 | 12.2 | 41,300 | 2.38 | 60 | 16.87 | 9.83 |
| Comparative Example 15 | Core particles 7 | 6.1 | C-1 | 6.1 | 14,200 | 1.86 | 66 | 21.86 | 6.63 |
| Comparative Example 16 | Core particles 8 | 11.1 | C-1 | 1.1 | 4,360 | 1.73 | 72 | 26.98 | 5.97 |
| Comparative Example 17 | Core particles 9 | 11.6 | C-1 | 0.6 | 5,296 | 1.71 | 73 | 27.82 | 6.54 |
| Comparative Example 18 | Core particles 10 | 11.1 | C-2 | 1.1 | 5,672 | 1.83 | 70 | 27.14 | 7.48 |
| Comparative Example 19 | Comparative Example 9 | 12.2 | — | — | 12,820 | 1.89 | 56 | 21.79 | 6.45 |
| Comparative Example 20 | Comparative Example 10 | 12.2 | — | — | 26,380 | 2.04 | 68 | 17.05 | 6.50 |
| Comparative Example 21 | Comparative Example 11 | 12.2 | — | — | 988 | 1.75 | 92 | 18.57 | 5.72 |
| Comparative Example 22 | Comparative Example 12 | 12.2 | — | — | 1,024 | 1.88 | 91 | 17.66 | 6.11 |

TABLE 17

| Examples | Production of water-based paint | | | | Properties of paint | | Properties of coating film | | |
|---|---|---|---|---|---|---|---|---|---|
| | Black composite particles | | Black pigments | | | | | Blackness | Light resistance |
| | Kind | Amount added (wt. part) | Kind | Amount added (wt. part) | Viscosity (cP) | Storage stability (-) | 60° gloss (%) | (L* value) (-) | (ΔE* value) (-) |
| Example 45 | Example 29 | 12.4 | — | — | 2,836 | 0.72 | 90 | 17.33 | 1.91 |
| Example 46 | Example 30 | 12.4 | — | — | 3,168 | 0.89 | 89 | 19.86 | 2.42 |
| Example 47 | Example 31 | 12.4 | — | — | 3,196 | 0.96 | 86 | 20.56 | 2.66 |
| Example 48 | Example 32 | 12.4 | — | — | 2,834 | 0.80 | 89 | 19.88 | 2.58 |
| Example 49 | Example 33 | 12.4 | — | — | 2,381 | 0.64 | 91 | 17.57 | 1.94 |
| Example 50 | Example 34 | 12.4 | — | — | 3,122 | 0.84 | 90 | 19.72 | 2.21 |
| Example 51 | Example 35 | 12.4 | — | — | 2,816 | 1.29 | 88 | 22.04 | 3.40 |
| Example 52 | Example 36 | 12.4 | — | — | 2,318 | 0.70 | 95 | 18.41 | 1.88 |

TABLE 18

| Comparative Examples | Production of water-based paint | | | | Properties of paint | | Properties of coating film | | |
|---|---|---|---|---|---|---|---|---|---|
| | Particles | | Black pigments | | | | | Blackness | Light resistance |
| | Kind | Amount added (wt. part) | Kind | Amount added (wt. part) | Viscosity (cP) | Storage stability (–) | 60° gloss (%) | (L* value) (–) | (ΔE* value) (–) |
| Comparative Example 23 | — | — | C-1 | 12.4 | 35,820 | 2.04 | 62 | 17.01 | 9.13 |
| Comparative Example 24 | — | — | C-2 | 12.4 | 56,890 | 2.30 | 59 | 16.92 | 9.73 |
| Comparative Example 25 | Core particles 7 | 6.2 | C-1 | 6.2 | 19,565 | 1.81 | 64 | 21.93 | 6.60 |
| Comparative Example 26 | Core particles 8 | 11.3 | C-1 | 1.1 | 6,240 | 1.71 | 70 | 27.14 | 5.94 |
| Comparative Example 27 | Core particles 9 | 11.8 | C-1 | 0.6 | 5,808 | 1.65 | 70 | 28.02 | 6.49 |
| Comparative Example 28 | Core particles 10 | 11.3 | C-2 | 1.1 | 6,816 | 1.76 | 68 | 27.37 | 7.43 |
| Comparative Example 29 | Comparative Example 9 | 12.4 | — | — | 15,652 | 1.81 | 48 | 21.95 | 6.41 |
| Comparative Example 30 | Comparative Example 10 | 12.4 | — | — | 39,260 | 2.00 | 65 | 17.11 | 6.47 |
| Comparative Example 31 | Comparative Example 11 | 12.4 | — | — | 923 | 1.72 | 90 | 18.63 | 5.66 |
| Comparative Example 32 | Comparative Example 12 | 12.4 | — | — | 947 | 1.86 | 88 | 17.78 | 6.02 |

TABLE 19

| Examples | Production of resin composition | | | | Properties of resin composition | | | Percentage of surface area of deteriorated and discolored portion when heated at 190° C. (%) | | |
|---|---|---|---|---|---|---|---|---|---|---|
| | Black composite particles | | Black pigments | | | | | | | |
| | Kind | Amount added (wt. part) | Kind | Amount added (wt. part) | Dispersing condition (–) | Blackness (L* value) (–) | Light resistance (ΔE* value) (–) | After 30 minutes | After 60 minutes | After 120 minutes |
| Example 53 | Example 29 | 5.0 | — | — | 5 | 17.69 | 1.96 | 0 | 0 | 0 |
| Example 54 | Example 30 | 5.0 | — | — | 5 | 19.89 | 2.56 | 0 | 0 | 5 |
| Example 55 | Example 31 | 5.0 | — | — | 5 | 20.46 | 2.68 | 0 | 5 | 5 |
| Example 56 | Example 32 | 5.0 | — | — | 4 | 19.39 | 2.76 | 0 | 5 | 5 |
| Example 57 | Example 33 | 5.0 | — | — | 5 | 17.69 | 1.96 | 0 | 0 | 0 |
| Example 58 | Example 34 | 5.0 | — | — | 5 | 19.73 | 2.33 | 0 | 0 | 0 |
| Example 59 | Example 35 | 5.0 | — | — | 4 | 22.25 | 3.41 | 0 | 5 | 10 |
| Example 60 | Example 36 | 5.0 | — | — | 5 | 18.38 | 2.02 | 0 | 0 | 5 |

TABLE 20

| Comparative Examples | Production of resin composition | | | | | | | Percentage of surface area of deteriorated and discolored portion when heated at 190° C. (%) | | |
|---|---|---|---|---|---|---|---|---|---|---|
| | Particles | | Black pigments | | | | | | | |
| | Kind | Amount added (wt. part) | Kind | Amount added (wt. part) | Dispersing condition (–) | Blackness (L* value) (–) | Light resistance (ΔE* value) (–) | After 30 minutes | After 60 minutes | After 120 minutes |
| Comparative Example 33 | — | — | C-1 | 5.0 | 1 | 17.18 | 10.17 | 10 | 20 | 35 |
| Comparative Example 34 | — | — | C-2 | 5.0 | 1 | 17.03 | 10.44 | 15 | 30 | 40 |
| Comparative Example 35 | Core particles 7 | 2.5 | C-1 | 2.5 | 1 | 21.94 | 7.26 | 10 | 10 | 30 |
| Comparative Example 36 | Core particles 8 | 4.5 | C-2 | 0.5 | 2 | 27.25 | 6.12 | 10 | 15 | 20 |
| Comparative Example 37 | Core particles 9 | 4.8 | C-1 | 0.2 | 2 | 28.17 | 7.15 | 10 | 20 | 20 |

TABLE 20-continued

| | Particles | | Black pigments | | | | | Percentage of surface area of deteriorated and discolored portion when heated at 190° C. (%) | | |
|---|---|---|---|---|---|---|---|---|---|---|
| | | | | | | | | Production of resin composition | | |
| Comparative Examples | Kind | Amount added (wt. part) | Kind | Amount added (wt. part) | Dispersing condition (−) | Blackness (L* value) (−) | Light resistance (ΔE* value) (−) | After 30 minutes | After 60 minutes | After 120 minutes |
| Comparative Example 38 | Core particles 10 | 4.5 | C-2 | 0.5 | 2 | 27.49 | 7.84 | 10 | 25 | 30 |
| Comparative Example 39 | Comparative Example 9 | 5.0 | — | — | 1 | 21.76 | 7.16 | 10 | 10 | 25 |
| Comparative Example 40 | Comparative Example 10 | 5.0 | — | — | 2 | 17.38 | 6.93 | 5 | 10 | 20 |
| Comparative Example 41 | Comparative Example 11 | 5.0 | — | — | 4 | 18.60 | 6.35 | 0 | 5 | 15 |
| Comparative Example 42 | Comparative Example 12 | 5.0 | — | — | 4 | 17.66 | 6.98 | 0 | 5 | 15 |

TABLE 21

Properties of white inorganic particles

| Kind of core particles | Kind | Shape | Average particle diameter (μm) | BET specific surface area value (m²/g) | L* value (−) | a* value (−) | b* value (−) | C* value (−) | Refractive index (−) | Ultraviolet light-shielding property (360 nm) (%) | Light resistance (ΔE* value) (−) |
|---|---|---|---|---|---|---|---|---|---|---|---|
| | | | | | Hue | | | | | | |
| Core particles 17 | Titanium oxide | Granular | 0.253 | 10.3 | 96.63 | −0.58 | −0.69 | 0.90 | 2.71 | 65 | 6.15 |
| Core particles 18 | Titanium oxide | Granular | 0.053 | 61.2 | 95.13 | 0.13 | 0.21 | 0.25 | 2.71 | 71 | 10.16 |
| Core particles 19 | Zinc oxide | Granular | 0.183 | 18.3 | 90.27 | −2.14 | 4.13 | 4.65 | 2.03 | 80 | 5.86 |

TABLE 22

| | | Surface-treating step | | | | | |
|---|---|---|---|---|---|---|---|
| | | Additives | | | Coating Material | | |
| Core particles | Kind of core particles | Kind | Calculated as | Amount (wt. %) | Kind | Calculated as | Amount (wt. %) |
| Core particles 20 | Core particles 17 | Sodium aluminate | Al | 1.0 | A | Al | 0.98 |
| Core particles 21 | Core particles 18 | Sodium aluminate Water glass #3 | Al SiO₂ | 1.5 1.0 | A S | Al SiO₂ | 1.48 0.99 |
| Core particles 22 | Core particles 19 | Water glass #3 | SiO₂ | 1.0 | S | SiO₂ | 0.98 |

TABLE 23

Properties of surface-treated white inorganic particles

| Kind of core particles | Average particle diameter (μm) | BET specific surface area value (m²/g) | L* value (−) | a* value (−) | b* value (−) | C* value (−) | Refractive index (−) | Light resistance (ΔE* value) (−) |
|---|---|---|---|---|---|---|---|---|
| | | | Hue | | | | | |
| Core particles 20 | 0.254 | 12.1 | 96.49 | −0.46 | −0.54 | 0.71 | 2.71 | 5.86 |
| Core particles 21 | 0.054 | 60.8 | 95.16 | 0.14 | 0.20 | 0.24 | 2.71 | 8.36 |

TABLE 23-continued

Properties of surface-treated white inorganic particles

| Kind of core particles | Average particle diameter (μm) | BET specific surface area value (m²/g) | Hue L* value (-) | Hue a* value (-) | Hue b* value (-) | Hue C* value (-) | Refractive index (-) | Light resistance (ΔE* value) (-) |
|---|---|---|---|---|---|---|---|---|
| Core particles 22 | 0.184 | 18.0 | 89.52 | -1.91 | 5.18 | 5.52 | 2.00 | 5.14 |

TABLE 24

Production of composite particles

| Examples and Comparative Examples | Kind of core particles | Coating step with gluing agent: Additives Kind | Amount (wt. part) | Edge Runner Treatment Linear Load (N/cm) | Edge Runner Treatment Linear Load (Kg/cm) | Time (min) | Coating amount (calculated as C) (wt. %) | Black pigments Kind | Amount added (wt. part) | Edge Runner Treatment Linear Load (N/cm) | Edge Runner Treatment Linear Load (Kg/cm) | Time (min) | Amount coated (calculated as C) (wt. %) |
|---|---|---|---|---|---|---|---|---|---|---|---|---|---|
| Example 61 | Core particles 17 | Methyl triethoxysilane | 1.0 | 588 | 60 | 30 | 0.06 | C-1 | 50.0 | 392 | 40 | 60 | 33.18 |
| Example 62 | Core particles 18 | γ-aminopropyl triethoxysilane | 1.5 | 392 | 40 | 60 | 0.24 | C-2 | 100.0 | 588 | 60 | 30 | 40.87 |
| Example 63 | Core particles 19 | Polyvinyl alcohol | 1.0 | 588 | 60 | 20 | 0.54 | C-1 | 50.0 | 392 | 40 | 60 | 33.09 |
| Example 64 | Core particles 20 | Isopropyl triisostearoyl titanate | 1.0 | 392 | 40 | 30 | 0.74 | C-2 | 75.0 | 392 | 40 | 120 | 35.02 |
| Example 65 | Core particles 21 | Methyl hydrogen polysiloxane | 2.0 | 588 | 60 | 20 | 0.53 | C-1 | 10.0 | 588 | 60 | 60 | 9.05 |
| Example 66 | Core particles 22 | Methyl hydrogen polysiloxane | 1.0 | 392 | 40 | 20 | 0.26 | C-2 | 30.0 | 392 | 40 | 180 | 18.78 |
| Comparative Example 43 | Core particles 17 | — | — | — | — | — | — | C-1 | 50.0 | 588 | 60 | 60 | 33.12 |
| Comparative Example 44 | Core particles 17 | Methyl triethoxysilane | 1.0 | 588 | 60 | 30 | 0.06 | — | — | — | — | — | — |
| Comparative Example 45 | Core particles 17 | Methyl triethoxysilane | 1.0 | 588 | 60 | 60 | 0.06 | C-1 | 750.0 | 588 | 60 | 60 | 88.14 |
| Comparative Example 46 | Core particles 11 | Methyl triethoxysilane | 1.0 | 588 | 60 | 60 | 0.06 | C-1 | 50.0 | 588 | 60 | 60 | 33.11 |
| Comparative Example 47 | Core particles 12 | Methyl triethoxysilane | 1.0 | 588 | 60 | 60 | 0.06 | C-1 | 50.0 | 588 | 60 | 60 | 33.15 |

TABLE 25

Properties of composite particles

| Examples and Comparative Examples | Average particle diameter (μm) | BET specific surface area value (m²/g) | L* value (-) | Tinting strength (%) | Repose angle (°) | Volume resistivity value (Ω·cm) | Ultraviolet light-shielding property (360 nm) (%) | Surface activity (%) | Light resistance (ΔE* value) (-) | Black pigment desorption percentage (%) |
|---|---|---|---|---|---|---|---|---|---|---|
| Example 61 | 0.255 | 14.1 | 25.85 | 183 | 38 | $8.6 \times 10^4$ | 93 | 0.77 | 2.23 | 7.6 |
| Example 62 | 0.057 | 59.3 | 18.36 | 192 | 36 | $2.3 \times 10^{11}$ | 92 | 0.63 | 2.18 | 8.3 |
| Example 63 | 0.185 | 21.3 | 19.14 | 186 | 37 | $7.6 \times 10^4$ | 93 | 0.74 | 1.91 | 7.8 |
| Example 64 | 0.257 | 14.6 | 24.17 | 184 | 36 | $1.2 \times 10^{11}$ | 90 | 0.56 | 1.98 | 4.7 |
| Example 65 | 0.055 | 65.4 | 21.62 | 129 | 38 | $2.1 \times 10^5$ | 91 | 0.95 | 2.20 | 2.6 |
| Example 66 | 0.186 | 18.6 | 19.98 | 176 | 37 | $6.3 \times 10^{10}$ | 90 | 0.72 | 1.89 | 3.5 |
| Comparative Example 43 | 0.253 | 18.3 | 27.33 | 100 | 48 | $1.9 \times 10^5$ | 68 | 2.21 | 6.02 | 64.3 |
| Comparative Example 44 | 0.253 | 9.6 | 96.78 | 100 | 49 | $5.7 \times 10^9$ | 66 | 2.65 | 6.11 | — |
| Comparative Example 45 | 0.269 | 68.3 | 19.60 | 194 | 54 | $8.9 \times 10^2$ | 90 | 2.28 | 5.83 | 33.4 |

TABLE 25-continued

| | Properties of composite particles | | | | | | | | | |
|---|---|---|---|---|---|---|---|---|---|---|
| Examples and Comparative Examples | Average particle diameter (μm) | BET specific surface area value (m²/g) | L* value (−) | Tinting strength (%) | Repose angle (°) | Volume resistivity value (Ω·cm) | Ultraviolet light-shielding property (360 nm) (%) | Surface activity (%) | Light resistance (ΔE* value) (−) | Black pigment desorption percentage (%) |
| Comparative Example 46 | 0.325 | 12.2 | 17.76 | 131 | 48 | $8.7 \times 10^3$ | 76 | 1.83 | 5.14 | 7.6 |
| Comparative Example 47 | 0.232 | 17.9 | 17.14 | 136 | 50 | $7.5 \times 10^3$ | 79 | 1.88 | 5.49 | 7.5 |

TABLE 26

| | Production of paint | | | | Properties of paint | | | Properties of coating film | |
|---|---|---|---|---|---|---|---|---|---|
| | Composite particles | | Black pigments | | | | | | |
| Examples | Kind | Amount added (wt. part) | Kind | Amount added (wt. part) | Viscosity (cP) | Storage stability (−) | 60° gloss (%) | Blackness (L* value) (−) | Light resistance (ΔE* value) (−) |
| Example 67 | Example 61 | 12.2 | — | — | 1,168 | 0.98 | 94 | 26.32 | 2.38 |
| Example 68 | Example 62 | 12.2 | — | — | 983 | 0.91 | 96 | 18.61 | 2.31 |
| Example 69 | Example 63 | 12.2 | — | — | 868 | 1.04 | 95 | 19.31 | 2.12 |
| Example 70 | Example 64 | 12.2 | — | — | 1,024 | 0.95 | 99 | 24.33 | 2.16 |
| Example 71 | Example 65 | 12.2 | — | — | 1,152 | 0.90 | 103 | 21.75 | 2.38 |
| Example 72 | Example 66 | 12.2 | — | — | 1,216 | 1.02 | 100 | 20.34 | 2.01 |

TABLE 27

| | Production of paint | | | | Properties of paint | | | Properties of coating film | |
|---|---|---|---|---|---|---|---|---|---|
| | Particles | | Black pigments | | | | | | |
| Comparative Examples | Kind | Amount added (wt. part) | Kind | Amount added (wt. part) | Viscosity (cP) | Storage stability (−) | 60° gloss (%) | L* value (−) | Light resistance (ΔE* value) (−) |
| Comparative Example 48 | Core particles 17 | 8.1 | C-1 | 4.1 | 1,234 | 1.83 | 68 | 30.19 | 6.26 |
| Comparative Example 49 | Core particles 18 | 6.1 | C-2 | 6.1 | 1,381 | 1.82 | 71 | 25.46 | 10.37 |
| Comparative Example 50 | Core particles 19 | 8.1 | C-1 | 4.1 | 1,414 | 2.03 | 65 | 27.08 | 6.11 |
| Comparative Example 51 | Comparative Example 43 | 12.2 | — | — | 12,860 | 1.81 | 66 | 28.38 | 6.35 |
| Comparative Example 52 | Comparative Example 44 | 12.2 | — | — | 1,382 | 1.85 | 84 | 96.89 | 6.42 |
| Comparative Example 53 | Comparative Example 45 | 12.2 | — | — | 25,600 | 2.01 | 70 | 20.72 | 6.01 |
| Comparative Example 54 | Comparative Example 46 | 12.2 | — | — | 964 | 1.78 | 79 | 18.14 | 5.40 |
| Comparative Example 55 | Comparative Example 47 | 12.2 | — | — | 988 | 1.94 | 76 | 17.57 | 5.74 |

TABLE 28

| | Production of water-based paint | | | | Properties of paint | | | Properties of coating film | |
|---|---|---|---|---|---|---|---|---|---|
| | Composite particles | | Black pigments | | | | | | |
| Examples | Kind | Amount added (wt. part) | Kind | Amount added (wt. part) | Viscosity (cP) | Storage stability (−) | 60° gloss (%) | L* value (−) | Light resistance (ΔE* value) (−) |
| Example 73 | Example 61 | 12.4 | — | — | 2,380 | 0.97 | 89 | 26.61 | 2.41 |
| Example 74 | Example 62 | 12.4 | — | — | 3,162 | 0.90 | 92 | 18.80 | 2.33 |
| Example 75 | Example 63 | 12.4 | — | — | 2,862 | 1.04 | 90 | 19.51 | 2.09 |
| Example 76 | Example 64 | 12.4 | — | — | 2,562 | 0.94 | 94 | 24.42 | 2.18 |

TABLE 28-continued

|  | Production of water-based paint | | | | Properties of paint | | Properties of coating film | | |
|---|---|---|---|---|---|---|---|---|---|
|  | Composite particles | | Black pigments | | | | | | |
| Examples | Kind | Amount added (wt. part) | Kind | Amount added (wt. part) | Viscosity (cP) | Storage stability (—) | 60° gloss (%) | L* value (—) | Light resistance (ΔE* value) (—) |
| Example 77 | Example 65 | 12.4 | — | — | 2,483 | 0.90 | 100 | 21.83 | 2.35 |
| Example 78 | Example 66 | 12.4 | — | — | 2,616 | 1.03 | 95 | 20.32 | 1.98 |

TABLE 29

|  | Production of water-based paint | | | | Properties of paint | | Properties of coating film | | |
|---|---|---|---|---|---|---|---|---|---|
|  | Particles | | Black pigments | | | | | | |
| Comparative Examples | Kind | Amount added (wt. part) | Kind | Amount added (wt. part) | Viscosity (cP) | Storage stability (—) | 60° gloss (%) | L* value (—) | Light resistance (ΔE* value) (—) |
| Comparative Example 56 | Core particles 17 | 8.3 | C-1 | 4.1 | 15,652 | 1.81 | 65 | 30.48 | 6.30 |
| Comparative Example 57 | Core particles 18 | 6.2 | C-2 | 6.2 | 18,363 | 1.77 | 68 | 25.77 | 10.41 |
| Comparative Example 58 | Core particles 19 | 8.3 | C-1 | 4.1 | 16,148 | 2.00 | 62 | 27.36 | 6.09 |
| Comparative Example 59 | Comparative Example 43 | 12.4 | — | — | 15,034 | 1.82 | 64 | 28.59 | 6.38 |
| Comparative Example 60 | Comparative Example 44 | 12.4 | — | — | 2,362 | 1.85 | 81 | 96.80 | 6.41 |
| Comparative Example 61 | Comparative Example 45 | 12.4 | — | — | 2,232 | 1.99 | 69 | 20.84 | 5.95 |
| Comparative Example 62 | Comparative Example 46 | 12.4 | — | — | 906 | 1.76 | 75 | 18.23 | 5.42 |
| Comparative Example 63 | Comparative Example 47 | 12.4 | — | — | 914 | 1.92 | 71 | 17.59 | 5.73 |

TABLE 30

|  | Production of resin composition | | | | | Properties of resin composition | | | |
|---|---|---|---|---|---|---|---|---|---|
|  | Composite particles | | Black pigments | | | | | Percentage of surface area of deteriorated and discolored portion when heated at 190° C. (%) | | |
| Examples | Kind | Amount added (wt. part) | Kind | Amount added (wt. part) | Dispersing condition (—) | L* value (—) | Light resistance (ΔE* value) (—) | After 30 minutes | After 60 minutes | After 120 minutes |
| Example 79 | Example 61 | 5.0 | — | — | 5 | 26.92 | 2.48 | 0 | 5 | 5 |
| Example 80 | Example 62 | 5.0 | — | — | 5 | 19.03 | 2.43 | 0 | 0 | 5 |
| Example 81 | Example 63 | 5.0 | — | — | 5 | 19.72 | 2.18 | 0 | 5 | 5 |
| Example 82 | Example 64 | 5.0 | — | — | 5 | 25.00 | 2.26 | 0 | 0 | 5 |
| Example 83 | Example 65 | 5.0 | — | — | 5 | 22.13 | 2.41 | 0 | 5 | 10 |
| Example 84 | Example 66 | 5.0 | — | — | 5 | 20.66 | 2.05 | 0 | 5 | 5 |

TABLE 31

|  | Production of resin composition | | | | | Properties of resin composition | | | |
|---|---|---|---|---|---|---|---|---|---|
|  | Particles | | Black pigments | | | | | Percentage of surface area of deteriorated and discolored portion when heated at 190° C. (%) | | |
| Comparative Examples | Kind | Amount added (wt. part) | Kind | Amount added (wt. part) | Dispersing condition (—) | L* value (—) | Light resistance (ΔE* value) (—) | After 30 minutes | After 60 minutes | After 120 minutes |
| Comparative Example 64 | Core particles 17 | 3.3 | C-1 | 1.7 | 2 | 30.51 | 6.75 | 5 | 15 | 35 |

TABLE 31-continued

| | Production of resin composition | | | | Properties of resin composition | | | | | |
| | Particles | | Black pigments | | | | Light resistance | Percentage of surface area of deteriorated and discolored portion when heated at 190° C. (%) | | |
| Comparative Examples | Kind | Amount added (wt. part) | Kind | Amount added (wt. part) | Dispersing condition (−) | L* value (−) | (ΔE* value) (−) | After 30 minutes | After 60 minutes | After 120 minutes |
|---|---|---|---|---|---|---|---|---|---|---|
| Comparative Example 65 | Core particles 18 | 2.5 | C-2 | 2.5 | 1 | 25.79 | 10.83 | 10 | 20 | 40 |
| Comparative Example 66 | Core particles 19 | 3.3 | C-1 | 1.7 | 2 | 27.43 | 6.47 | 5 | 15 | 30 |
| Comparative Example 67 | Comparative Example 43 | 5.0 | — | — | 1 | 28.66 | 6.61 | 5 | 15 | 35 |
| Comparative Example 68 | Comparative Example 44 | 5.0 | — | — | 3 | 96.74 | 6.92 | 5 | 10 | 25 |
| Comparative Example 69 | Comparative Example 45 | 5.0 | — | — | 2 | 20.87 | 6.32 | 5 | 10 | 20 |
| Comparative Example 70 | Comparative Example 46 | 5.0 | — | — | 2 | 18.26 | 5.65 | 0 | 5 | 20 |
| Comparative Example 71 | Comparative Example 47 | 5.0 | — | — | 2 | 17.65 | 6.03 | 0 | 10 | 20 |

What is claimed is:

1. Composite particles having an average particle diameter of 0.001 to 12.0 μm, comprising:
   white inorganic particles as core particles;
   a gluing agent-coating layer formed on at least a parts of the surface of said white inorganic particle; and
   a black pigment coat composed of carbon black, aniline black or both carbon black and aniline black, formed onto at least a part of the gluing agent-coating layer in an amount of from 1 to 500 parts by weight based on 100 parts by weight of said white inorganic particles.

2. Composite particles according to claim 1, wherein said composite particles have a BET specific surface area value of 0.5 to 500 m$^2$/g.

3. Composite particles according to claim 1, wherein a coating layer comprising at least one compound selected from the group consisting of hydroxides of aluminum, oxides of aluminum, hydroxides of silicon and oxides of silicon, is disposed between the surface of the respective white inorganic particle and the gluing agent-coating layer.

4. Composite particles according to claim 3, wherein the amount of the coating layer comprising at least one compound selected from the group consisting of hydroxides of aluminum, oxides of aluminum, hydroxides of silicon and oxides of silicon, is 0.01 to 20% by weight, calculated as Al, SiO$_2$ or a sum of Al and SiO$_2$, based on the weight of the white inorganic particles.

5. Composite particles according to claim 1, wherein said white inorganic particles are (1) silica particles, (2) white inorganic particles having a refractive index of less than 2.0, or (3) white inorganic particles having a refractive index of not less than 2.0.

6. Composite particles according to claim 5, wherein said silica particles are anhydrous silicic acid powder, hydrous silicic acid powder, silicate powder or silica gel.

7. Composite particles according to claim 5, wherein said white inorganic particles (2) having a refractive index of less than 2.0 are anhydrous silicic acid powder, hydrous silicic acid powder and silicate powder, silica gel, diatomaceous earth powder clay, calcium carbonate, barium sulfate, talc or alumina white.

8. Composite particles according to claim 5, wherein said white inorganic particles (3) having a refractive index at not less than 2.0 are titanium oxide particles or zinc oxide particles.

9. Composite particles according to claim 1, wherein said composite particles are composite silica particles (1) having an average particle diameter of 0.001 to 0.6 μm and comprising silica particles as core particles; a coating layer formed on at least a part of the surface of the silica particles, comprising organosilane compounds obtainable from alkoxysilanes, or polysiloxanes; and a carbon black coat formed on at least a part of the surface of the coating layer in an amount of 1 to 500 parts by weight based on 100 parts of the silica particles.

10. Composite particles according to claim 9, further comprising an outer surface coat comprising a fatty acid, a metal salt of fatty acid or a coupling agent.

11. Composite particles according to claim 10, wherein the amount of the outer surface coat comprising a fatty acid, a metal salt of fatty acid or a coupling agent is 0.1 to 10.0% by weight, calculated as C, based on the weight of the composite particles.

12. Composite particles according to claim 1, wherein said composite particles are composite particles having an average particle diameter of 0.001 to 12.0 μm and comprising white inorganic particles having a refractive index of less than 2.0 as core particles; the gluing agent-coating layer formed on at least a part of the surface of the white inorganic particle; and a black pigment coat formed onto at least a part of the gluing agent-coating layer in an amount of from 1 to 500 parts by weight based on 100 parts by weight of the white inorganic particles, composed of carbon black, aniline black or both carbon black and aniline black.

13. Composite particles according to claim 12, wherein said composite particles have a BET specific surface area value of 0.5 to 500 m$^2$/g, a blackness (L* value) of 14.5 to 30.0, a black pigment desorption percentage of not more than 20%, and a repose angle of not more than 45°.

14. Composite particles according to claim 1, wherein said composite particles are composite particles having an average particle diameter of 0.001 to 12.0 μm and comprising white inorganic particles having a refractive index of not less than 2.0 as core particles; the gluing agent-coating layer formed on at least a part of the surface of the white inorganic particle; and a black pigment coat formed onto at least a part of the gluing agent-coating layer in an amount of from 1 to 500 parts by weight based on 100 parts by weight of the white inorganic particles, comprising carbon black, aniline black or carbon black and aniline black.

15. Composite particles according to claim 14, wherein said composite particles have a Bet specific surface area value of 0.5 to 500 m$^2$/g, a blackness (L* value) of 14.5 to 90.0, a black pigment desorption percentage of not more than 20%, and a repose angle of not more than 4°.

16. A pigment comprising composite particles defined in claim 1.

17. A tread rubber composition, comprising:

100 parts by weight of a rubber component; and 10 to 200 parts by weight of the pigment composed of the composite particles defined in claim 9.

18. A tread rubber composition according to claim 17, wherein said tread rubber composition has a volume resistivity value of not more than 1.0×10$^5$ Ω·cm, a tensile strength of not less than 23.0 MPa, and a light resistance (ΔE* value) of not more than 5.0.

19. A paint comprising:

said pigment composed of the composite particles defined in claim 12; and a paint base material.

20. A paint according to claim 19, wherein the amount of said composite particles is 0.5 to 100 parts by weight based on 100 parts by weight of said paint base material.

21. A rubber or resin composition comprising:

said pigment composed of the composite particles defined in claim 12; and a base material for rubber or resin composition.

22. A rubber or resin composition according to claim 21, wherein the amount of said composite particles is 0.5 to 200 parts by weight based on 100 parts by weight of said base material for rubber or resin composition.

* * * * *